United States Patent
Mori et al.

(10) Patent No.: US 11,448,757 B2
(45) Date of Patent: Sep. 20, 2022

(54) DISTANCE MEASURING DEVICE

(71) Applicant: PANASONIC INTELLECTUAL PROPERTY MANAGEMENT CO., LTD., Osaka (JP)

(72) Inventors: Keiichi Mori, Osaka (JP); Seiji Nakamura, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 566 days.

(21) Appl. No.: 16/464,238

(22) PCT Filed: Nov. 27, 2017

(86) PCT No.: PCT/JP2017/042318
§ 371 (c)(1),
(2) Date: May 24, 2019

(87) PCT Pub. No.: WO2018/101187
PCT Pub. Date: Jun. 7, 2018

(65) Prior Publication Data
US 2019/0391266 A1    Dec. 26, 2019

(30) Foreign Application Priority Data
Nov. 29, 2016  (JP) .............................. JP2016-230890

(51) Int. Cl.
*G01S 17/00* (2020.01)
*G01S 17/10* (2020.01)
(Continued)

(52) U.S. Cl.
CPC ............ *G01S 17/10* (2013.01); *G01S 7/4915* (2013.01); *G01S 17/89* (2013.01); *G02B 7/32* (2013.01)

(58) Field of Classification Search
USPC ....................................................... 356/5.01
See application file for complete search history.

(56) References Cited

U.S. PATENT DOCUMENTS 8,768,010 B2 * 7/2014 Korekado ............ H04N 5/2256
                                                      382/106
9,659,371 B2 * 5/2017 Scharfenberger ......... G06T 7/33
(Continued)

FOREIGN PATENT DOCUMENTS

JP    2006-253876 A    9/2006
JP    2011-064498 A    3/2011
(Continued)

OTHER PUBLICATIONS

Extended European Search Report dated Sep. 27, 2019, for the corresponding European Patent Application No. 17876971.7.
(Continued)

*Primary Examiner* — James R Hulka
(74) *Attorney, Agent, or Firm* — McDermott Will & Emery LLP

(57) ABSTRACT

In a distance measuring device that measures a distance to an object using a round-trip time of light, a solid-state image sensor includes a plurality of pixel groups capable of being exposed independently, and causes each of the plurality of pixel groups to receive, at a different exposure time, reflected light from the object that is originally pulsed radiation light from a light emitter. A light emission and exposure controller cyclically and intermittently exposes each of the plurality of pixel groups of the solid-state image sensor at the different exposure time to obtain pixel signals of types corresponding to a time difference between the reflected light and the radiation light, and a signal processor obtains information about the distance to the object according to pixel signals of adjacent pixels exposed at different exposure times for each of the plurality of pixel groups.

10 Claims, 18 Drawing Sheets

(51) Int. Cl.
  *G01S 7/4915* (2020.01)
  *G01S 17/89* (2020.01)
  *G02B 7/32* (2021.01)

(56) References Cited

U.S. PATENT DOCUMENTS

| | | | |
|---|---|---|---|
| 9,881,235 B1* | 1/2018 | Narimanzadeh | G06K 9/38 |
| 10,151,835 B2* | 12/2018 | Ito | G01S 7/4814 |
| 10,422,879 B2* | 9/2019 | Nagai | G01S 17/89 |
| 2010/0141791 A1* | 6/2010 | Fujiwara | H04N 5/2353 348/226.1 |
| 2011/0194099 A1* | 8/2011 | Kamiyama | G01S 17/10 356/5.03 |
| 2012/0177252 A1 | 7/2012 | Korekado et al. | |
| 2012/0236190 A1* | 9/2012 | Ogasahara | H04N 9/04553 348/302 |
| 2014/0139668 A1 | 5/2014 | Short | |
| 2014/0333825 A1* | 11/2014 | Nakagawara | H04N 5/2353 348/362 |
| 2015/0312459 A1* | 10/2015 | Nakagawara | H04N 5/2353 348/228.1 |
| 2016/0161611 A1 | 6/2016 | Ito et al. | |
| 2017/0315238 A1 | 11/2017 | Nagai | |

FOREIGN PATENT DOCUMENTS

| | | |
|---|---|---|
| JP | 2012-225807 A | 11/2012 |
| JP | 2016-099233 A | 5/2016 |
| WO | 2015/025497 A1 | 2/2015 |

OTHER PUBLICATIONS

Nayar, S. K. et al., "High Dynamic Range Imaging: Spatially Varying Pixel Exposures," IEEE Conference on Computer Vision and Pattern Recognition (CVPR), Jun. 2000, vol. 1, pp. 472-479.
International Search Report and Written Opinion issued in International Patent Application No. PCT/JP2017/042318, dated Feb. 27, 2018; with partial English translation.

* cited by examiner

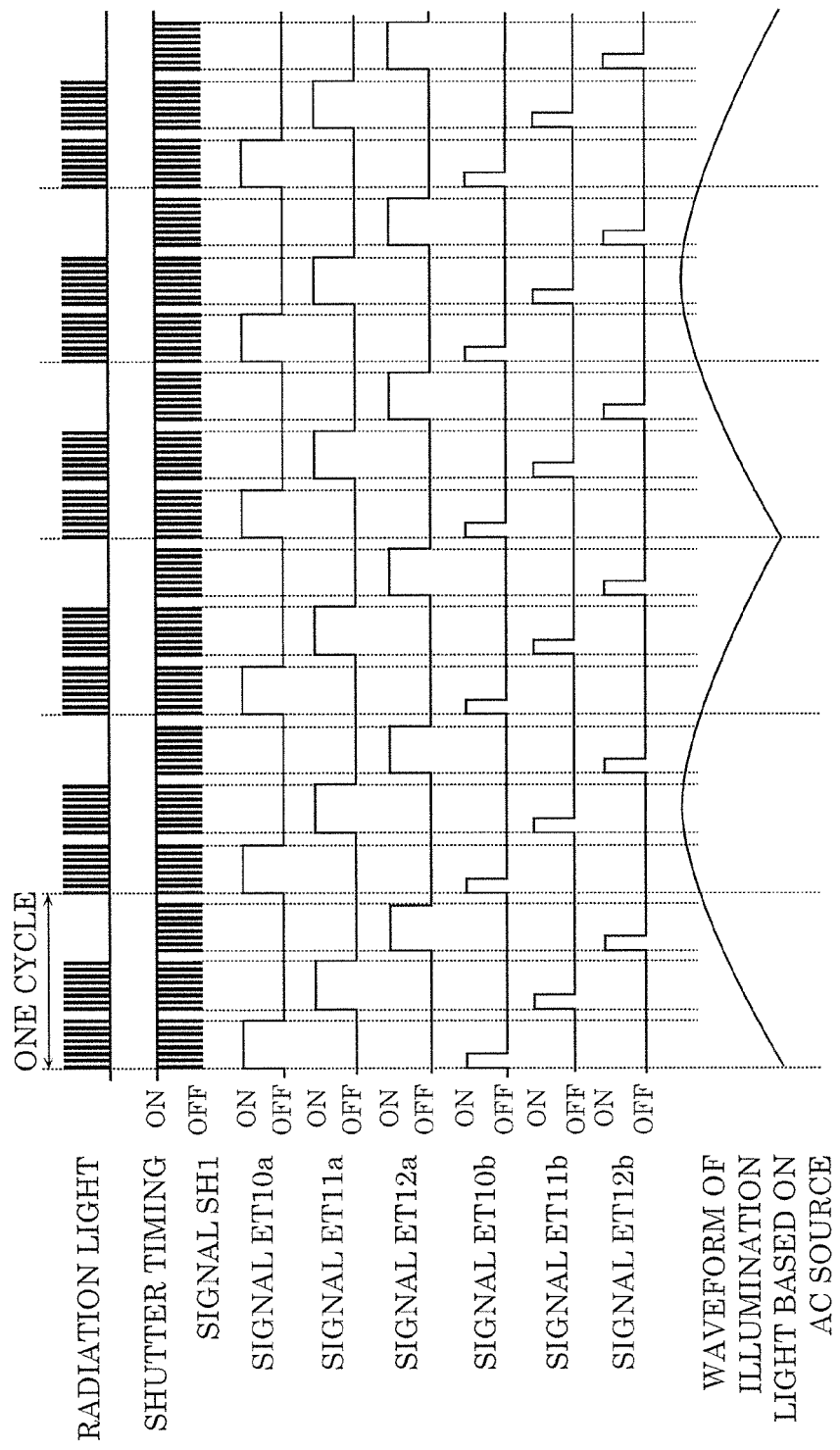

DISTANCE MEASURING DEVICE

CROSS-REFERENCE OF RELATED APPLICATIONS

This application is the U.S. National Phase under 35 U.S.C. § 371 of International Patent Application No. PCT/JP2017/042318, filed on Nov. 27, 2017, which in turn claims the benefit of Japanese Application No. 2016-230890, filed on Nov. 29, 2016, the entire disclosures of which Applications are incorporated by reference herein.

TECHNICAL FIELD

The present disclosure relates to distance measuring devices that generate a distance image, and in particular to a distance measuring device that includes a radiation light source and a solid-state image sensor that receives light, and measures a distance using delay in the round trip of light.

BACKGROUND ART

In recent years, a time of flight (TOF) technique for calculating (measuring) a distance to a subject based on a measurement time from when infrared light or laser light is radiated to the subject to when light reflected by the subject is received by a solid-state image sensor is known as an example of a method of measuring a distance to a subject to generate a distance image.

In conventional TOF techniques, distance measurement is performed by causing a solid-state image sensor including a pixel array to receive light reflected by a subject, and generating the amount of signal as a distance image indicating a distance distribution on a two-dimensional plane (see, for example, Patent Literatures 1 to 3).

CITATION LIST

Patent Literature

PTL 1: Japanese Unexamined Patent Application Publication No. 2012-225807
PTL 2: Japanese Unexamined Patent Application Publication No. 2006-253876
PTL 3: Japanese Unexamined Patent Application Publication No. 2011-64498

SUMMARY OF THE INVENTION

Technical Problems

However, since conventional distance measuring devices obtain a distance image under an exposure condition that differs for each time series on a per frame basis, devices having a narrow distance measurable range have the accuracy of distance measurement that decreases when a distance to an object changes. Moreover, since the conventional distance measuring devices measure a distance by combining distance images that differ in exposure, the conventional distance measuring devices have unstable measurement accuracy due to a variation in the exposures resulting in the distance images when the distance images include ambient light other than radiation light, such as background light.

In view of these problems, the present disclosure has an object to provide a distance measuring device that can perform distance measurement with reasonable accuracy in a distance measurement range that is unaffected by the distance change of an object.

Solution to Problems

A distance measuring device of the present disclosure is a distance measuring device that measures a distance to an object using a round-trip time of light, and includes: a light emitter including a light source that radiates light to a measurement target range; a solid-state image sensor that includes a plurality of pixels included in a plurality of pixel groups capable of being exposed independently, and causes the plurality of pixels to perform photoelectric conversion of reflected light from the object within an angle of view of radiation light from the light emitter, the plurality of pixels being arranged in a matrix; a light emission and exposure controller that (i) instructs a light emission timing and a light emission period of the light source to the light emitter, (ii) instructs, to each of the plurality of pixel groups in the solid-state image sensor, an exposure timing and an exposure period for obtaining pixel signals of types corresponding to a time difference between the radiation light and the reflected light due to a round-trip time of light, and (iii) intermittently exposes the plurality of pixels by exposing each of the plurality of pixel groups at a different exposure time in at least two cyclic exposure periods according to the exposure timing and the exposure period, the pixel signals of the types corresponding to the time difference between the radiation light and the reflected light; and a signal processor that calculates a distance value of the object of which an image is formed by the solid-state image sensor, according to pixel signals of at least two adjacent pixels exposed at the different exposure times for each of the plurality of pixel groups in the solid-state image sensor, the pixel signals corresponding to the time difference.

Advantageous Effect of Invention

According to the present disclosure, a distance measuring device can perform distance measurement with reasonable accuracy in a distance measurement range that is unaffected by the distance change of an object.

BRIEF DESCRIPTION OF DRAWINGS

FIG. 6A is a timing chart for light emission and exposure control in the distance measuring device according to Embodiment 1.

Figure 1:
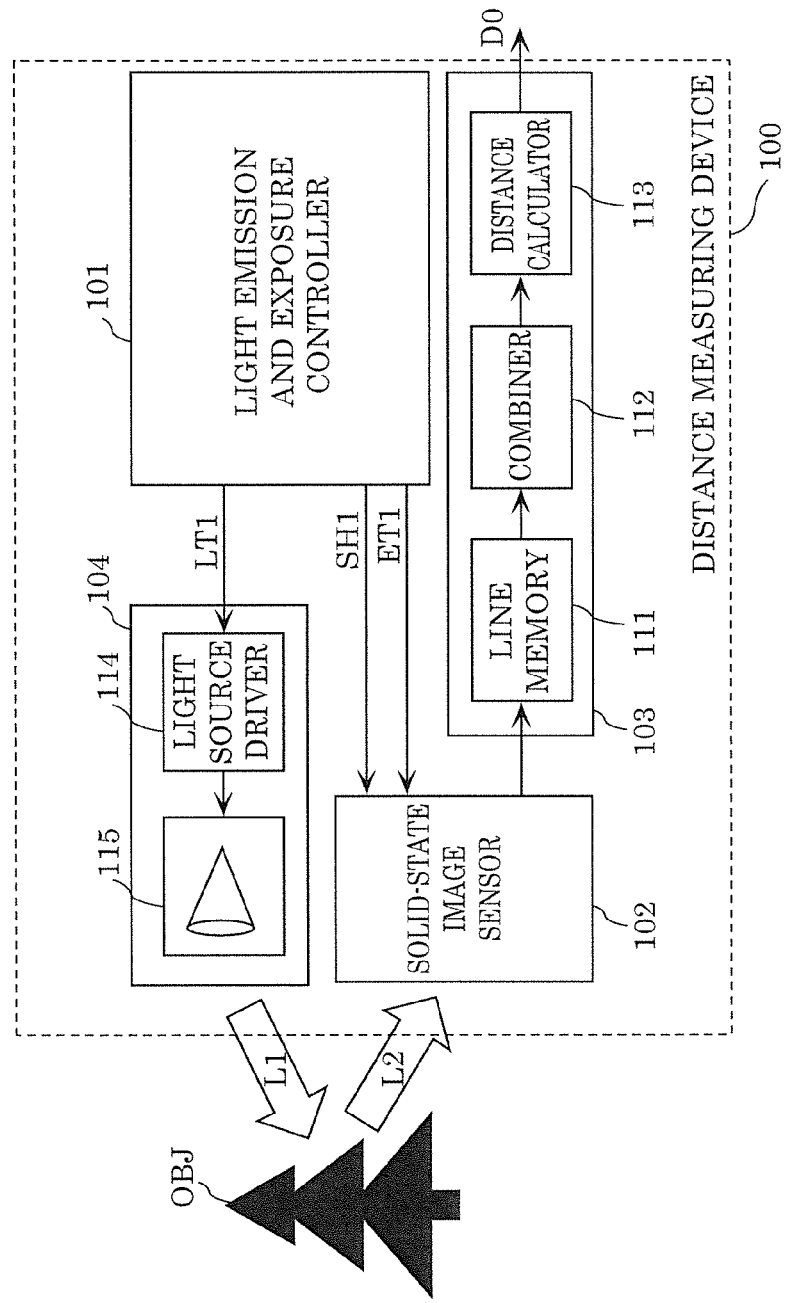
FIG. 1 is a schematic block diagram illustrating a distance measuring device.

DESCRIPTION OF EXEMPLARY EMBODIMENTS (Underlying Knowledge Forming Basis of the Present Disclosure)

Devices for or methods of generating an image (hereinafter also referred to as a distance image) having the distance information of a subject have been recently applied not only to the gaming or amusement field but also to a field in which a two-dimensional image sensor, such as a vehicle-mounted camera or a security camera, are used.

Examples of a method of measuring a distance to a subject to generate a distance image include a method of generating a distance image based on a parallax between images captured by cameras, and a method of generating a distance image based on a parallax resulting from radiating light having a known random dot pattern to a subject and receiving reflected light having the dot pattern. In a TOF technique that is one example of these methods, a distance to a subject is calculated (measured) based on a measurement time from when infrared light or laser light is radiated to the subject to when light reflected by the subject is received by a solid-state image sensor.

In conventional TOF techniques, a solid-state image sensor including a pixel array is caused to receive light reflected by a subject, distance information can be obtained, for each pixel of the solid-state image sensor, from the obtained amount of signal, and a distance image indicating a distance distribution on a two-dimensional plane can be obtained.

With such techniques, the intensity of received reflected light changes greatly according to a distance from the solid-state image sensor to the subject or the surface reflectance of the subject. In response, the intensity of a radiation light source, the light sensitivity of the solid-state image sensor, or an exposure amount is kept constant. However, when there are objects having different distances in the light-receiving surface of the solid-state image sensor, it is difficult to achieve reasonable distance measurement performance over an entire distance image.

The intensity of reflected light received by the solid-state image sensor depends on the characteristics of light that attenuates in inverse proportion to a square of the distance from the light source to the subject, or the surface reflectance of the subject. For example, when an exposure amount is increased by adjusting exposure to reflected light, the intensity of reflected light from a close subject or a subject having a high surface reflectance becomes higher, and the exposure amount exceeds an exposure amount receivable by the solid-state image sensor to reach a saturation state. In this case, it is impossible to obtain a correct light amount signal. Conversely, when an exposure amount is decreased, the amount of reflected light from a far subject or a subject having a low surface reflectance becomes very small. In this case, it is difficult to stably measure a distance.

PTLs 1, 2, and 3 are disclosed as solutions to such a technical problem as described above.

In PTLs 1 and 3, distance images that differ in exposure are obtained, the distance images are combined, and a distance measurement range is expanded and the accuracy of measuring a distance is improved.

In PTL 2, in a solid-state image sensor, signal charge storage times are separately set for even-numbered pixel rows and odd-numbered pixel rows to extract signals having different sensitivities, and a signal-processing system disposed at a subsequent stage combines the signals having the different sensitivities. Specifically, for example, a storage time is set to be long for each pixel of the even-numbered rows to obtain a pixel signal having a high sensitivity, and a storage time is set to be short for each pixel of the odd-numbered rows to obtain a pixel signal having a low sensitivity. In a combination process, generally, pixel signals (pixel signals having a high sensitivity) in the even-numbered rows are selected from pixels in the even-numbered rows when the pixel signals in the even-numbered rows are not saturated, and pixel signals (pixel signals having a low sensitivity) in the odd-numbered rows are selected from adjacent pixels in the odd-numbered rows when the pixel signals in the even-numbered rows are saturated.

However, since a distance measuring device in PTL 1 or 3 obtains a distance image under an exposure condition that differs for each time series on a per frame basis, the distance measuring device has the accuracy of distance measurement that decreases when a distance to an object changes. Moreover, since the distance measuring device stores distance images that differ in exposure, the distance measuring device requires a frame memory that stores a distance value for each pixel of a solid-state image sensor. For this reason, the increase in the number of pixels of the solid-state image sensor requires a larger-capacity frame memory, and the distance measuring device grows in size and costs higher.

In the combination process of PTL 2, since only the pixel signals having the high sensitivity are used when the pixel signals having the high sensitivity are not saturated, the pixel information of the pixel signals having the low sensitivity are not used even when the pixel information is valid.

A distance measuring device to be described below can expand the distance measurement range of a solid-state image sensor within one frame, and obtain a distance image that is unaffected when a distance to an object changes along time series, the distance measurement range being restricted by the attenuation of light caused by the distance to the object or a decrease in the intensity of reflected light caused by the surface reflectance of the object. Moreover, the distance measuring device can remove the influence of disturbance caused by background light other than radiation light, and obtain a distance image having reasonable accuracy. For this reason, it is possible to provide the distance measuring device that does not require a frame memory or the like, is small, and costs low.

Hereinafter, embodiments according to the present disclosure will be described in detail with reference to the drawings.

(Explanation Common to Embodiments)

Each of the following embodiments describes, as an example, a case in which a TOF technique is used for measuring a distance by radiating light-emitting diode (LED) light or laser light to a subject and calculating a round-trip time of reflected light from the subject.

FIG. 1 is a schematic block diagram illustrating distance measuring device 100 according to Embodiment 1 or 2. Distance measuring device 100 shown in FIG. 1 includes light emission and exposure controller 101, solid-state image sensor 102, signal processor 103, and light emitter 104.

Examples of solid-state image sensor 102 include a charge-coupled device (CCD) image sensor and a complementary metal-oxide-semiconductor image (CMOS) sensor.

Light emitter 104 includes light source driver 114 and light source 115. Examples of light source 115 include an LED and a laser diode.

Signal processor 103 includes line memory 111, combiner 112, and distance calculator 113.

Light emission and exposure controller 101 generates and outputs light emission timing signal LT1, exposure timing signal ET1, and shutter timing signal SH1 according to a predetermined condition to be described below. ON and OFF control is performed on light source driver 114 in light emitter 104 according to light emission timing signal LT1, and light source 115 radiates light L1 toward object OBJ. Radiation light L1 is pulsed light having a predetermined light emission width.

Radiation light L1 is reflected by object OBJ. Reflected light L2 is received by solid-state image sensor 102 via an optical lens not shown. Solid-state image sensor 102 includes pixels arranged in a matrix. Solid-state image sensor 102 controls the exposure of each pixel according to exposure timing signal ET1 and shutter timing signal SH1. A pixel signal corresponding to signal charges obtained as a result of photoelectric conversion and accumulated in each pixel is outputted to signal processor 103.

Figure 2:
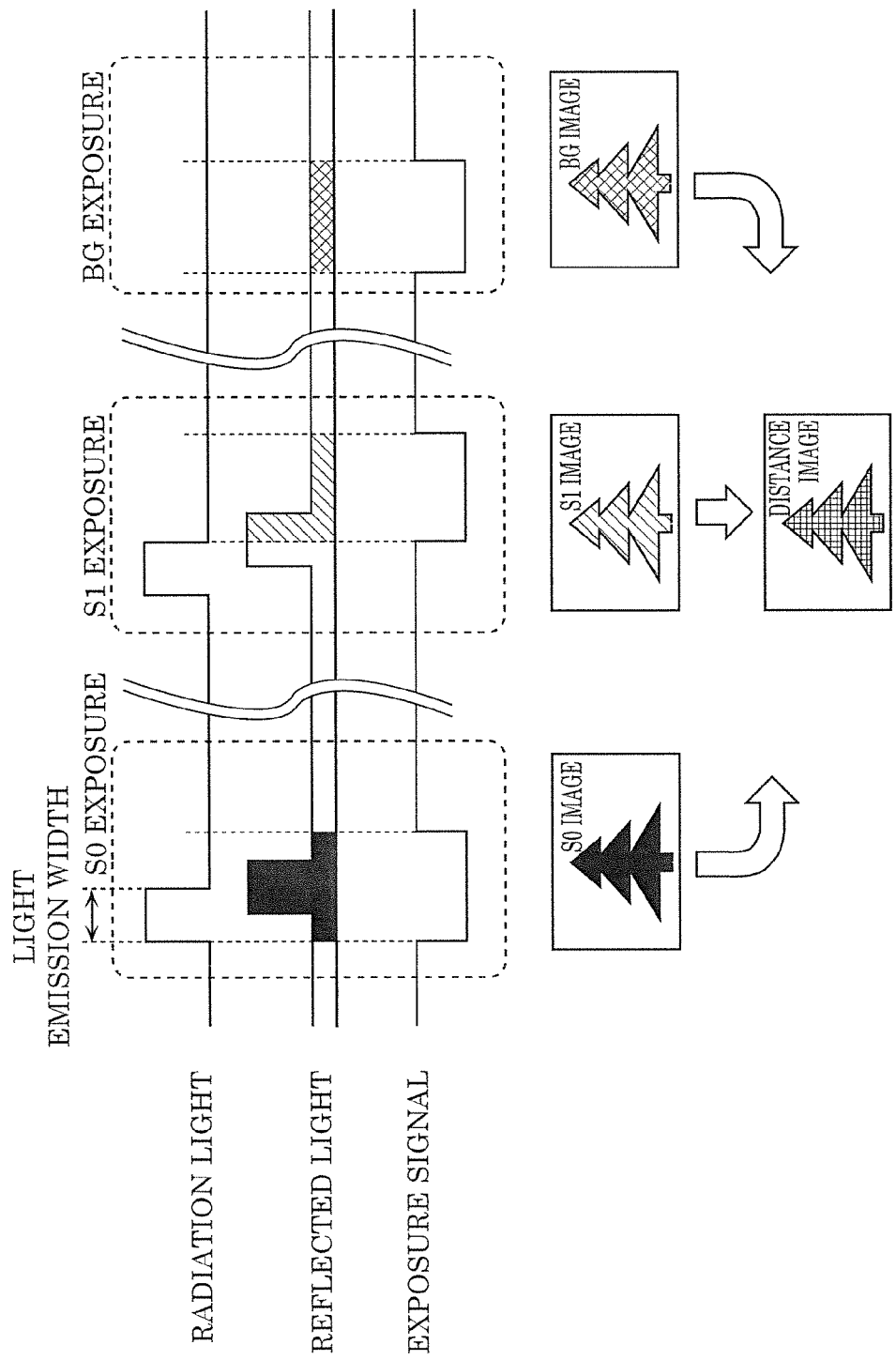
FIG. 2 is a diagram illustrating an example of a TOF technique.

FIG. 2 is a diagram illustrating an example of the TOF technique. The following describes an example of a method of measuring a distance in the TOF technique with reference to FIG. 2. The following are performed in the TOF technique: S0 exposure in which all of reflected light of pulsed light radiated by a light source is received; S1 exposure in which part of reflected light corresponding to a delayed time is received, the reflected light being temporally delayed due to a distance to an object by which the pulsed light is reflected; and BG exposure in which only background light is received without causing the light source to emit light. Moreover, background light is also received simultaneously in S0 exposure and S1 exposure. Electric charges are accumulated by repeating these three types of exposure multiple times, and pixel signals S0, S1, and BG corresponding to the amount of electric charges are obtained. Where a light emission pulse width (a radiation pulse time width) is denoted as $T_0$ and the speed of light is denoted as c, distance L from the light source to object OBJ can be determined by Expression 1.

[Math. 1]

$$L = \frac{c \times T_0}{2} \times \frac{S1 - BG}{S0 - BG} \qquad \text{(Expression 1)}$$

Figure 3:
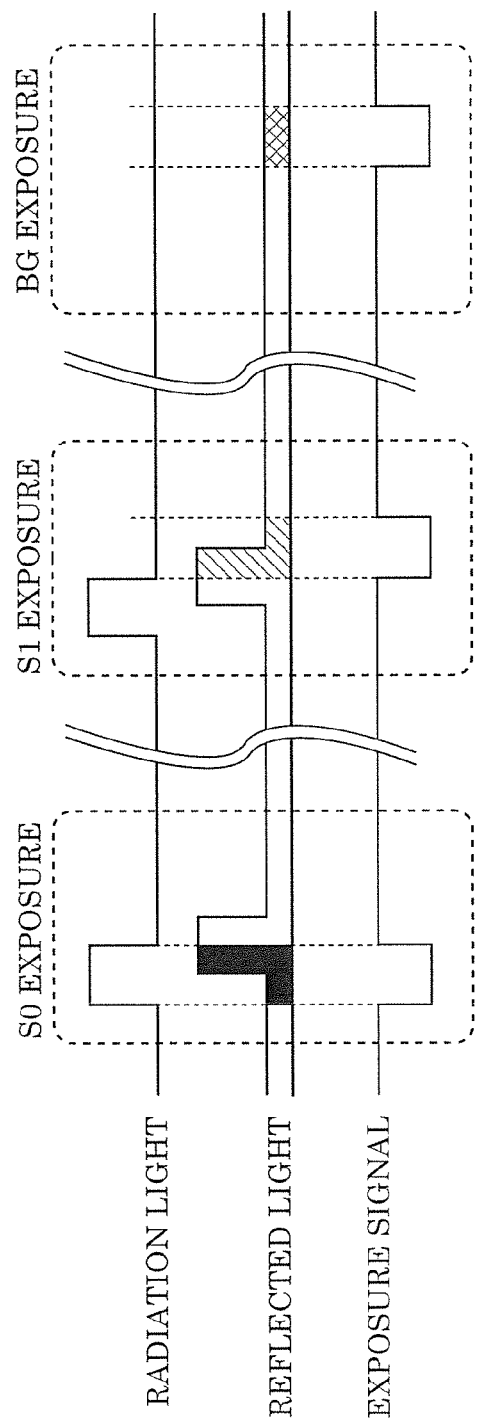
FIG. 3 is a diagram illustrating another example of the TOF technique.

FIG. 3 is a diagram illustrating another example of the TOF technique. In contrast to the example in FIG. 2, the length of an exposure period of the solid-state image sensor is approximately identical to a light emission pulse width, and there are S0 exposure in which reflected light reflected by an object and returning belatedly is received in approximately the same exposure period as the pulse light emission timing of radiation light, and S1 exposure in which part of reflected light returning after the completion of pulse light emission of radiation light is received. In this case, distance L to object OBJ can be determined by Expression 2.

[Math. 2]

$$L = \frac{c \times T_0}{2} \times \frac{S1 - BG}{(S0 - BG) + (S1 - BG)} \qquad \text{(Expression 2)}$$

It should be noted that exposure signal timings and distance calculation expressions are not limited to the above. For example, four pixel signals are obtained for each pixel group by emitting radiation light in sine waveform and receiving reflected light at timings corresponding to a phase of 0 degree, a phase of 90 degrees, a phase of 180 degrees, and a phase of 270 degrees relative to a phase of the sine wave of the radiation light. It is possible to use a method of calculating a time difference of the reflected time relative to the radiation light according to the ratio of a differential signal between the pixel signal having the phase of 0 degree and the pixel signal having the phase of 180 degrees to a differential signal between the pixel signal having the phase of 90 degrees and the pixel signal having the phase of 270 degrees, and converting the time difference into a distance.

Pixel signal groups (S0, S1, BG) inputted to signal processor 103 are stored corresponding to the pixels of solid-state image sensor 102 on a per line basis, in line memory 111. Combiner 112 obtains necessary pixel signals of reference pixels from line memory 111, and performs a combination process on the pixel signals. The result of the combination process performed by combiner 112 is inputted to distance calculator 113, and distance calculator 113 performs the calculation of Expression 1 or 2 using the combined pixel signals, and outputs distance value DO obtained as the result of the calculation.

Embodiment 1

Hereinafter, Embodiment 1 will be described. In the present embodiment, exposure timing signal ET1 outputted from light emission and exposure controller 101 includes a group of signals ET10*a*, ET11*a*, and ET12*a* and a group of signals ET10*b*, ET11*b*, and ET12*b*, each of the groups including a group of three exposure signals that are specifically exposure signal S0, exposure signal S1, and exposure signal BG described above. Light emission and exposure controller 101 outputs the signal groups to solid-state image sensor 102.

Figure 4:
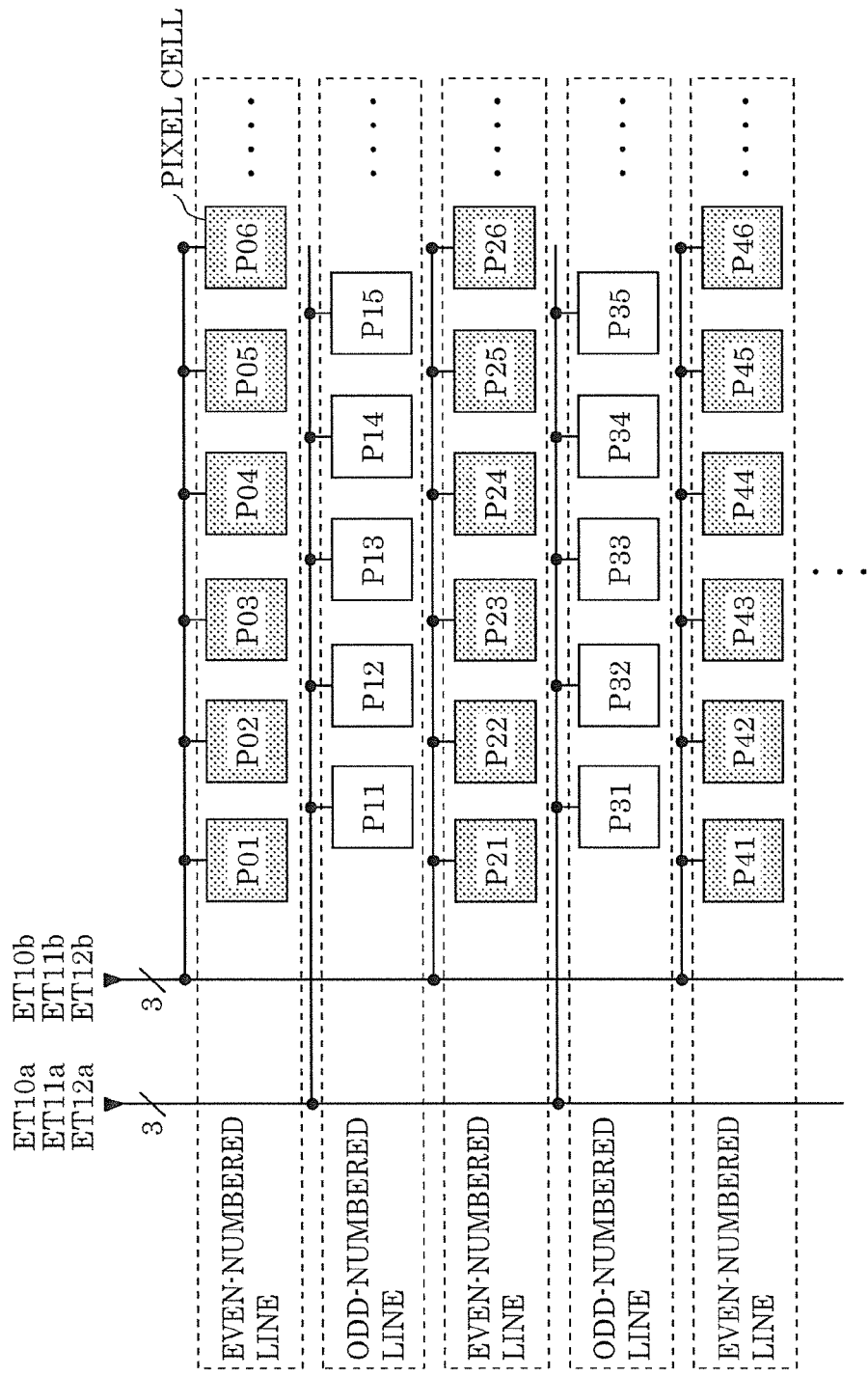
FIG. 4 is a schematic diagram illustrating a solid-state image sensor in a distance measuring device according to Embodiment 1.

FIG. 4 is a schematic diagram illustrating a solid-state image sensor in a distance measuring device according to the present embodiment. FIG. 4 shows an example of a connection relationship between the pixel cells of solid-state image sensor 102 and exposure timing signal lines. P01, P02, P03, . . . in FIG. 4 denote the pixel cells each including a photodiode region.

The pixel cells are displaced from their pixel positions by a half-pixel pitch in the horizontal direction between the odd-numbered lines and the even-numbered lines on a per line basis. Three signal lines for exposure timing signals ET10*a*, ET11*a*, and ET12*a* are connected to the pixel cells in the odd-numbered lines, and three signal lines for exposure timing signals ET10*b*, ET11*b*, and ET12*b* are connected to the pixel cells in the even-numbered lines. It should be noted that, though not shown, a line for supplying shutter timing signal SH1 is connected to all the pixel cells.

Figure 5:
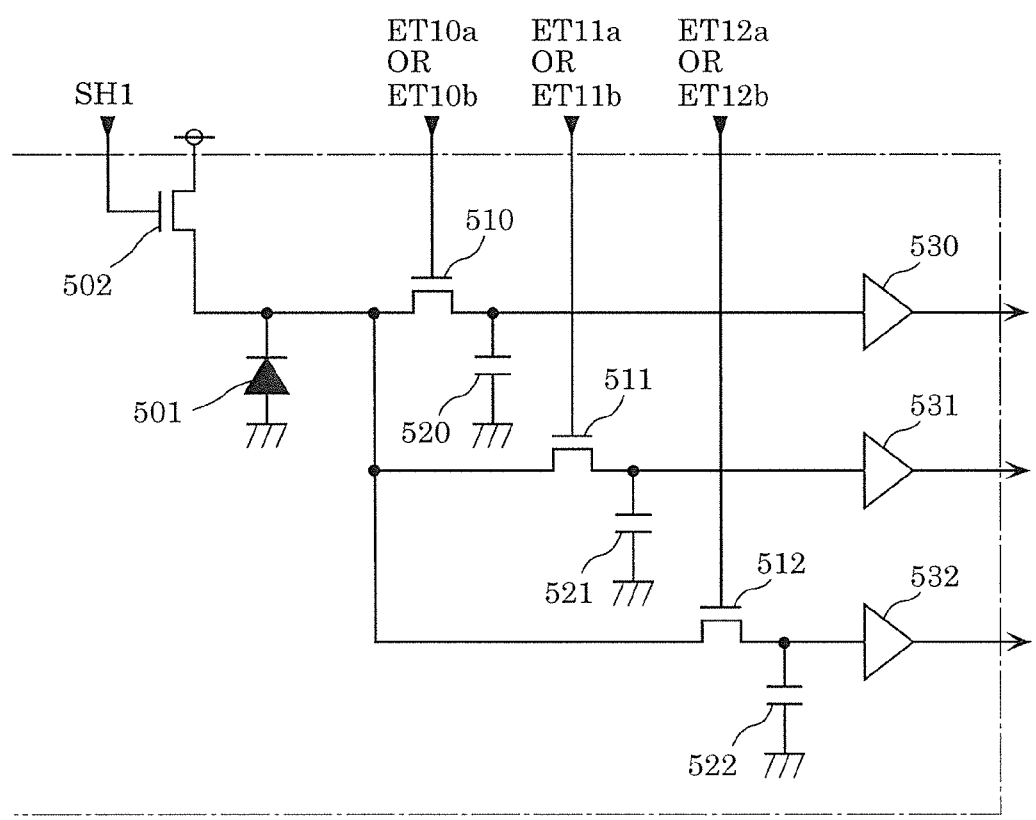
FIG. 5 is a schematic diagram illustrating a pixel cell of the solid-state image sensor in the distance measuring device according to Embodiment 1.

FIG. 5 is a schematic diagram illustrating, as an example, a pixel cell of the solid-state image sensor in the distance measuring device according to the present embodiment.

Photodiode 501 that performs photoelectric conversion is connected to reset transistor 502, and electric charges obtained as a result of photoelectric conversion by photodiode 501 are discarded when shutter timing signal SH1 becomes ON.

Moreover, photodiode 501 is connected to analog memories 520, 521, and 522 via analog switches 510, 511, and 512. In each pixel cell in the odd-numbered lines, exposure timing signal ET10*a* is supplied for ON and OFF control of analog switch 510, exposure timing signal ET11*a* is supplied for ON and OFF control of analog switch 511, and exposure timing signal ET12*a* is supplied for ON and OFF control of analog switch 512. Likewise, in each pixel cell in the even-numbered lines, exposure timing signal ET10*b* is supplied for ON and OFF control of analog switch 510, exposure timing signal ET11*b* is supplied for ON and OFF control of analog switch 511, and exposure timing signal ET12*b* is supplied for ON and OFF control of analog switch 512.

Analog memories 520, 521, and 522 accumulate electric charges obtained as a result of photoelectric conversion by photodiode 501, during a period in which analog switches 510, 511, and 512 connected to analog memories 520, 521, and 522 are ON, and a non-reset period in which reset transistor 502 is OFF. Further, analog memories 520, 521, and 522 do not accumulate electric charges during a period in which analog switches 510, 511, and 512 connected to analog memories 520, 521, and 522 are ON and a period in which reset transistor 502 is ON, or during a period in which analog switches 510, 511, and 512 are OFF.

With the above configuration, solid-state image sensor 102 can perform exposure control on each odd-numbered line and each even-numbered line independently.

Figure 6B:
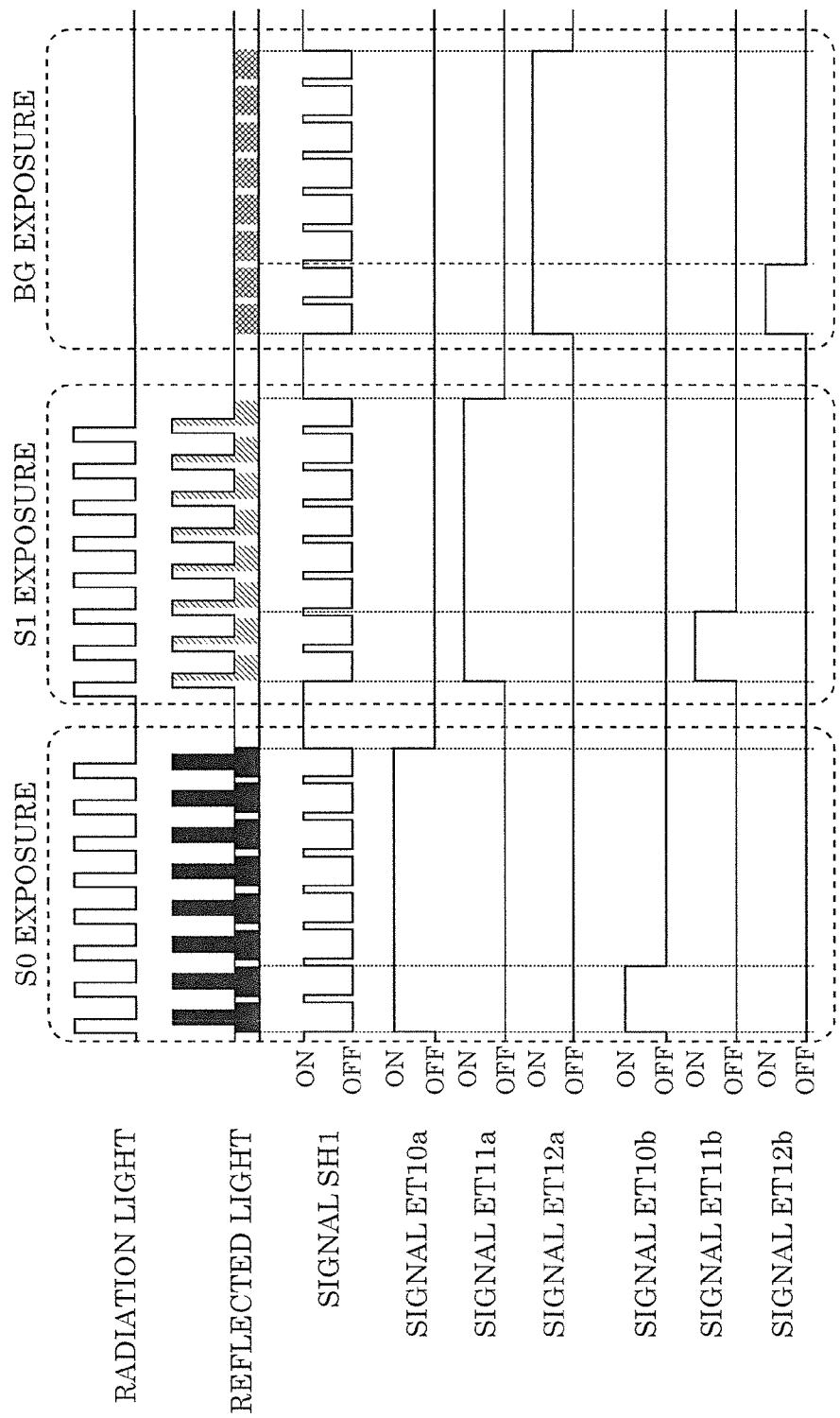
FIG. 6B is a timing chart for light emission and exposure control obtained by enlarging a portion of FIG. 6A.

FIG. 6A and FIG. 6B each show, as the first example of light emission and exposure control, an example of a relationship among an exposure timing signal, radiation light, and shutter timing signal SH1 outputted by light emission and exposure controller 101. FIG. 6A is a timing chart for light emission and exposure control in the distance measuring device according to the present embodiment.

As shown in FIG. 6A, pulsed radiation light emitted according to light emission timing signal LT1 generated and outputted by light emission and exposure controller 101, and exposure timing signal ET1 and shutter timing signal SH1 generated and outputted by light emission and exposure controller 101 are repeatedly outputted in cycles each of which has the same pattern. A time of one cycle (cycle Tcyc of an exposure period) is determined by, for example, 1/n (n is an integer greater than or equal to 2) of a light quantity fluctuation cycle (cycle time Tbg of a light source) of illumination light from a lighting device receiving power from a commercial AC source in an environment in which distance measuring device 100 is used. Number of cycles Ncyc is approximately set to n×m (m is an integer greater than or equal to 1). It should be noted that the total number of cycles is 6 as n=3 and m=2 in FIG. 6A, the present embodiment is not limited to this.

FIG. 6B is a diagram obtained by enlarging one cycle period in above-described FIG. 6A.

One cycle period includes, based on TOF technique 1 shown in above-described FIG. 2 and by Expression 1, an S0 exposure period, an S1 exposure period, and a BG exposure period that are formed according to shutter timing signal SH1 that is outputted by light emission and exposure controller 101 and generates a timing at which reset transistor 502 becomes ON.

Exposure timing signals ET10*a* and ET10*b* are supplied in the S0 exposure period, exposure timing signals ET11*a* and ET11*b* are supplied in the S1 exposure period, and exposure timing signals ET12*a* and ET12*b* are supplied in the BG exposure period.

Moreover, for example, in the S0 exposure, exposure timing signal ET10*a* is supplied in a period corresponding to 8 pulses of pulsed radiation light emitted according to light emission timing signal LT1, whereas exposure timing signal ET11*b* is supplied in a period corresponding to only 2 pulses. As described above, a time (the first condition) for accumulating, in analog memory 520, signals obtained as a result of photoelectric conversion by each pixel in the odd-numbered lines in solid-state image sensor 102 and a time (the second condition) for accumulating, in analog memory 520, signals obtained as a result of photoelectric conversion by each pixel in the even-numbered lines in solid-state image sensor 102 have a relationship in which the ratio of the signal accumulation times corresponding to exposure times is 4:1.

The same applies to the S1 exposure period and the BG exposure period.

It should be noted that the present embodiment has described an example of control in which the exposure time ratio is 4:1, the present embodiment is not limited to this. It is possible to easily determine a different exposure time ratio by modifying the above-described timing control.

In the above-described light emission and exposure timing control, when a signal accumulated in analog memory 520 of one pixel cell in an odd-numbered line in solid-state image sensor 102 by the S0 exposure is denoted as S0*odd*, S0*odd* is expressed by Expression 3.

$$S0odd = A0odd + B0odd \qquad \text{(Expression 3)}$$

In Expression 3, A0*odd* denotes the signal component due to radiation light, and B0*odd* denotes the signal component of background light.

When a signal accumulated in analog memory 521 of the one pixel cell in the odd-numbered line in solid-state image sensor 102 by the S1 exposure is denoted as S1*odd*, S1*odd* is expressed by Expression 4.

$$S1odd = A1odd + B1odd \qquad \text{(Expression 4)}$$

In Expression 4, A1$odd$ denotes the signal component due to radiation light, and B1$odd$ denotes the signal component of background light.

A signal accumulated in analog memory 521 of the one pixel cell in the odd-numbered line in solid-state image sensor 102 by the BG exposure is denoted as BGodd.

Likewise, when a signal accumulated in analog memory 520 of one pixel cell in an even-numbered line in solid-state image sensor 102, which is adjacent to the above-described one pixel cell in the odd-numbered line, is denoted as S0$evn$, S0$evn$ is expressed by Expression 5.

$$S0evn = A0evn + B0evn \quad \text{(Expression 5)}$$

In Expression 5, A0$evn$ denotes the signal component due to radiation light, and B0$evn$ denotes the signal component of background light.

When a signal accumulated in analog memory 521 of another pixel cell in the even-numbered line in solid-state image sensor 102 by the S1 exposure is denoted as S1$even$, S1$even$ is expressed by Expression 6.

$$S1evn = A1evn + B1evn \quad \text{(Expression 6)}$$

In Expression 6, A1$evn$ denotes the signal component due to radiation light, and B1$evn$ denotes the signal component of background light.

A signal accumulated in analog memory 521 of the other pixel cell in the even-numbered line in solid-state image sensor 102 by the BG exposure is denoted as BGevn.

Since the odd-numbered lines and the even-numbered lines in solid-state image sensor 102 have the ratio of 4:1 in exposure time as described above, when S0$odd$ in solid-state image sensor 102 has a light reception intensity that does not cause signal saturation, Expression 7 holds true between the adjacent pixel cell in the odd-numbered line and the pixel cell in the even-numbered line.

$$A0odd = 4 \times A0evn$$

$$A1odd = 4 \times A1evn \quad \text{(Expression 7)}$$

Moreover, even in an environment in which illumination light from a lighting device receiving power from a commercial AC source is present as background light that cyclically fluctuates, the S0 exposure, the S1 exposure, and the BG exposure are performed on the odd-numbered lines and the even-numbered lines in solid-state image sensor 102 to obtain pixel signals in each of six cyclical exposure periods in the present embodiment. The cycle of each exposure period is one-third of one cycle of a light quantity fluctuation in illumination light from the lighting device receiving the power from the commercial AC source, and intermittent exposure is performed. For this reason, since electric charges obtained as a result of photoelectric conversion of background light by solid-state image sensor 102 in exposure periods regardless of the cyclic fluctuation are sequentially accumulated in analog memories 520, 521, and 522, the background light components of pixel signals S0, S1, and BG are averaged. As a result, Expression 8 holds true regardless of the fluctuation in background light.

$$BGodd = B0odd = B1odd$$

$$BGevn = B0evn = B1evn \quad \text{(Expression 8)}$$

Further, Expression 9 holds true, and it is possible to accurately extract only the signal component of the illumination light from which the background light components are removed.

$$A0odd = S0odd - BGodd$$

$$A0odd = S1odd - BGodd$$

$$A0evn = S0evn - BGevn$$

$$A1evn = S1evn - BGevn \quad \text{(Expression 9)}$$

It is clear from Expression 7 and Expression 8 described above that even under illumination light whose intensity fluctuates due to a commercial AC source or the like, its ambient light is prevented, and Expression 10 holds true.

$$S0odd - BGodd = 4 \times (S0evn - BGevn)$$

$$S1odd - BGodd = 4 \times (S1evn - BGevn) \quad \text{(Expression 10)}$$

Even when the exposure control that differs in exposure time is performed within the same frame of solid-state image sensor 102 in the environment in which the illumination light from the lighting device receiving the power from the commercial AC source is noise, the operations of light emission and exposure controller 101 in the first example of the light emission and exposure control make it possible to average the signals including the background light components subject to the fluctuation in intensity of the illumination light. For this reason, it is possible to eliminate an unbalanced amount of the signals including the background light components among the S0 exposure, the S1 exposure, and the BG exposure for the odd-numbered lines and the even-numbered lines in solid-state image sensor 102.

In particular, in a pixel having a short exposure time relative to one cycle of the light quantity fluctuation in illumination light from the lighting device receiving the power from the commercial AC source, the background light component of a pixel signal is greatly affected by locally biased intensities of fluctuating background light. In a second condition pixel group having a short exposure time as described in the present embodiment, however, since the locally biased intensities of the background light are averaged to make signal S0 and signal S1 identical in background light component to signal BG, it is possible to accurately extract signals including illumination light components in the S0 exposure and the S1 exposure.

Furthermore, in the first example of the light emission and exposure control, since light emission from a light source for exposing a pixel having a long exposure time under the first condition is partially used as light emission for exposing a pixel having a short exposure time under the second condition, there produces an effect of minimizing the electric power of the illumination light source. This concludes the description of the first example of the light emission and exposure control.

Figure 7:
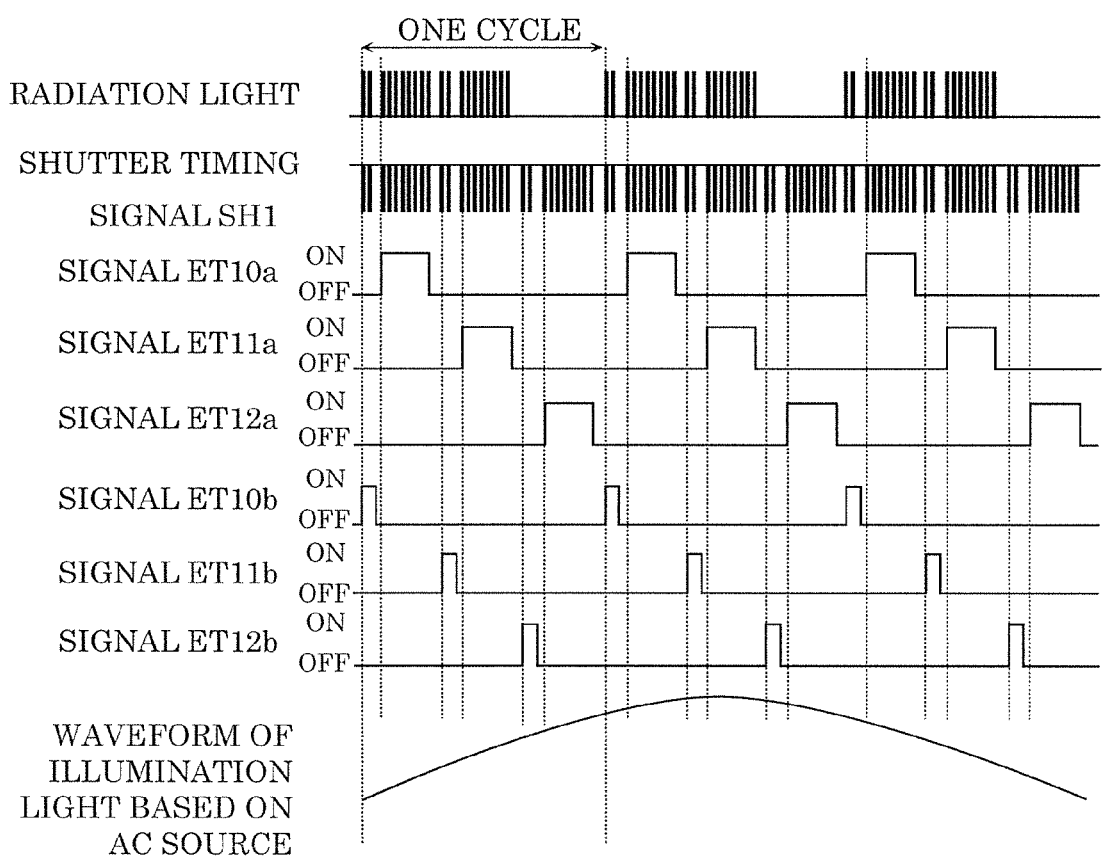
FIG. 7 is a timing chart for light emission and exposure control in the distance measuring device according to Embodiment 1.

Next, the second example of the light emission and exposure control will be described with reference to FIG. 7. The method of controlling light emission control timing shown in FIG. 7 is different from the method of controlling light emission and exposure timing shown in FIG. 6A. In the method of controlling light emission control timing shown in FIG. 7, the emission of illumination light for exposing odd-numbered lines, which is the first condition, is temporally separated from the emission of illumination light for exposing even-numbered lines, which is the second condition.

In the light emission and exposure timing control, exposure timings and exposure periods for the odd-numbered lines and the even-numbered lines are temporally separated. For this reason, for example, it is possible to avoid optical influence on second condition pixel signals caused by stray light reaching in a second condition exposure period with a time delay due to its long travel distance, the stray light being generated by illumination light not subject to the second condition exposure period being reflected by the inner surface of a lens disposed in front of solid-state image sensor 102, or being generated by reflected light traveling from an object having a high reflectance in the illumination range of illumination light to a target and being secondarily reflected by the target. This concludes the description of the second example of the light emission and exposure control.

After the exposures shown in above-described FIG. 6A or FIG. 7 are performed, solid-state image sensor 102 sequentially reads out signal S0, signal S1, and signal BG for each pixel in the pixel array in the order of raster scan, using a built-in timing generator not shown etc. The read signal S0, signal S1, and signal BG for each pixel are outputted to signal processor 103.

The pixel signals inputted from solid-state image sensor 102 are sequentially stored as signals S0$odd$, signals S1$odd$, and signals BGodd of the odd-numbered lines as many as a predetermined number of lines, and signals S0$evn$, signals S2$evn$, and signals BGevn of the even-numbered lines as many as a predetermined number of lines, in line memory 111 in signal processor 103. The pixel signals to be sequentially referred to are outputted to combiner 112.

Figure 8:
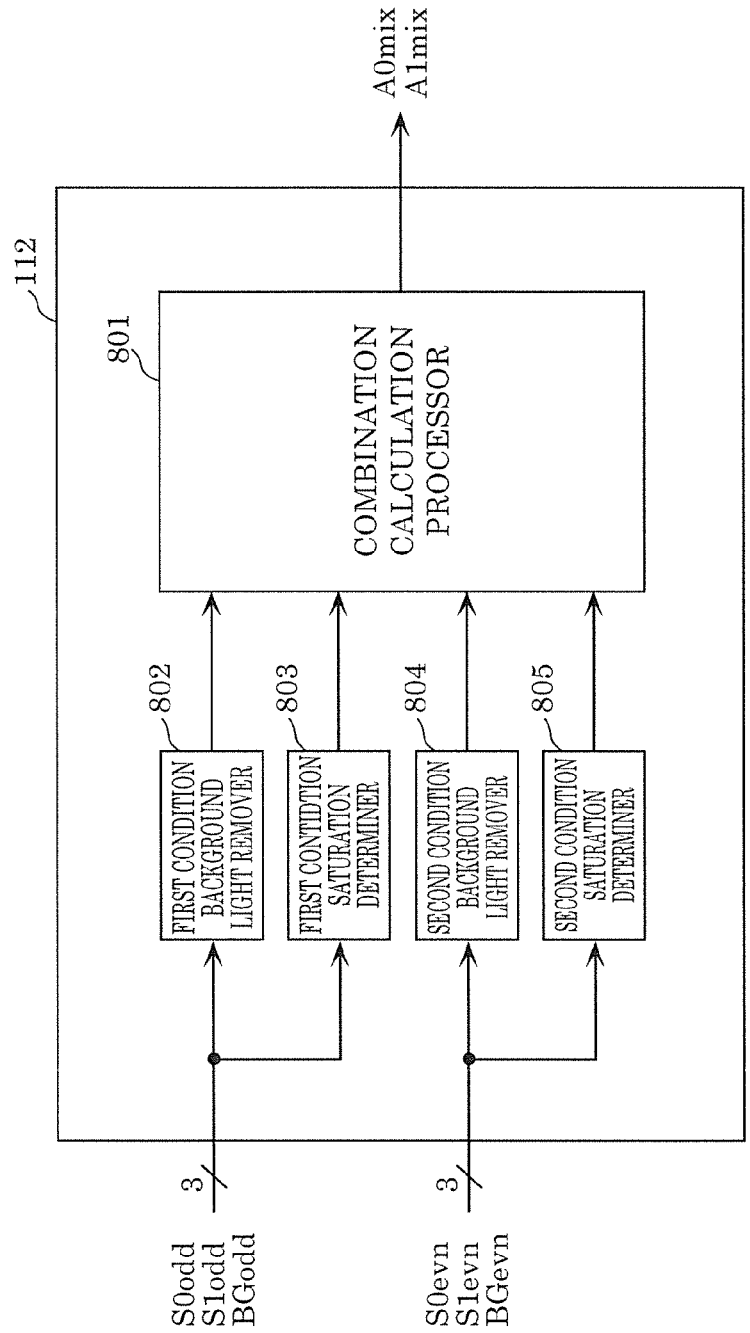
FIG. 8 is a schematic block diagram illustrating a combiner in the distance measuring device according to Embodiment 1.

Next, the following describes an example of the configuration of combiner 112. FIG. 8 is a schematic block diagram illustrating the combiner in the distance measuring device according to Embodiment 1.

As shown in FIG. 8, combiner 112 includes combination calculation processor 801, first condition background light remover 802, first condition saturation determiner 803, second condition background light remover 804, and second condition saturation determiner 805.

Figure 9:
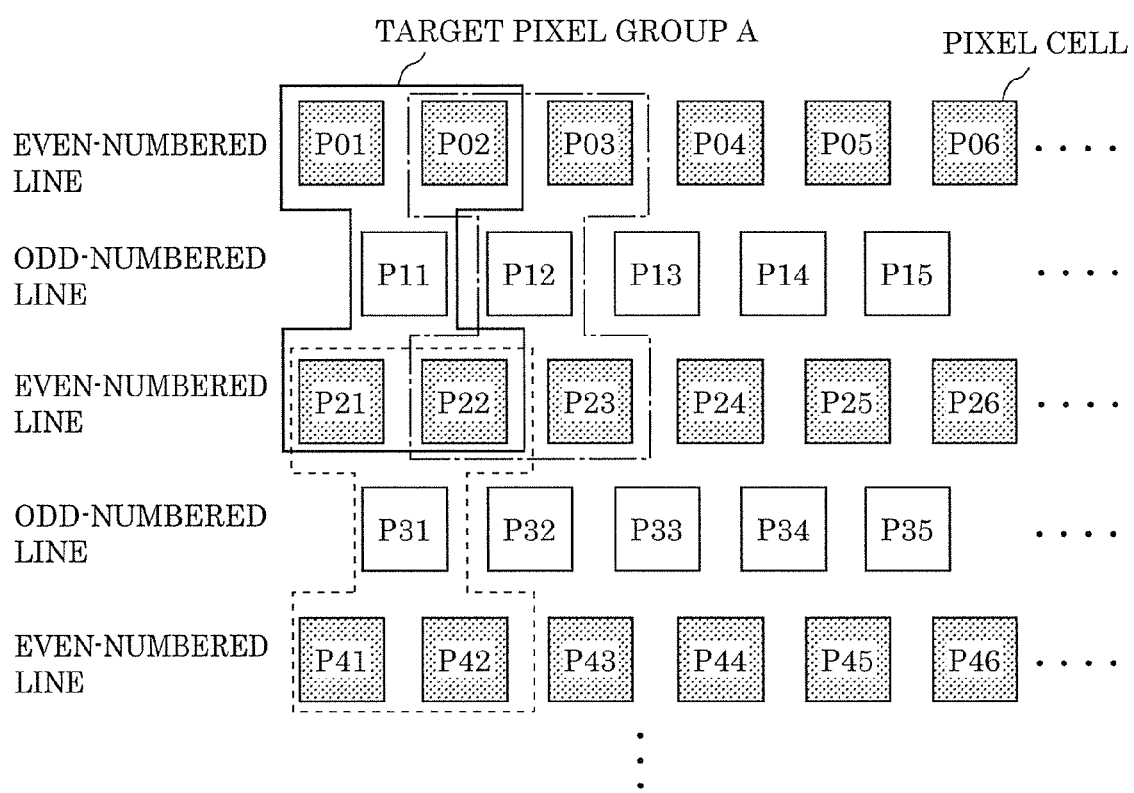
FIG. 9 is a pixel diagram referred to by the combiner in the distance measuring device according to Embodiment 1.

In addition, a relationship among pixel groups referred to when combination is performed is shown as the first example of combiner 112. FIG. 9 is a pixel diagram referred to by combiner 112 in the distance measuring device according to the present embodiment.

Combiner 112 receives, from line memory 111, signals S0, signals S1, and signals BG of one pixel in the odd-numbered line and four pixels in the even-numbered lines which are adjacent above and below to the one pixel as shown in FIG. 9, the one pixel and the four pixels being included as processing objects in target pixel group A.

For example, a pixel group of P01, P02, P11, P21, and P22 in FIG. 9 is target pixel group A. Combiner 112 sequentially performs a combination process on, for example, a group of P02, P03, P12, P22, and P23 and a group of P21, P22, P31, P41, and P42. In the following description, P01, P02, P11, P21, and P22, target pixel group A in FIG. 9, are used as an example.

As shown in FIG. 8, in combiner 112, input signals S0$odd$(P11), S1$odd$(P11), and BGodd(P11) of the one pixel in the odd-numbered line are inputted to first condition background light remover 802 and first condition saturation determiner 803. S0$odd$(P11), S1$odd$(P11), and BGodd(P11) denote signal S0$odd$, signal S1$odd$, and signal BGodd of pixel 11, respectively.

First condition background light remover 802 makes a calculation using Expression 11, and outputs A0$odd$(P11) and A1$odd$(P11) to combination calculation processor 801.

$$A0odd(P11) = S0odd(P11) - BGodd(P11)$$

$$A1odd(P11) = S1odd(P11) - BGodd(P11) \quad \text{(Expression 11)}$$

First condition saturation determiner 803 determines the conditions of Expression 12 for saturation determination threshold value Smax pre-set corresponding to the output signal range of solid-state image sensor 102. When any of the conditions of Expression 12 is satisfied, first condition saturation determiner 803 informs combination calculation processor 801 about the presence of a saturation signal.

$$S0odd(P11) > S\,\text{max}$$

$$S1odd(P11) > S\,\text{max}$$

$$BGodd(P11) > S\,\text{max} \quad \text{(Expression 12)}$$

Input signals S0$evn$(P01), S1$evn$(P01), BGevn(P01), S0$evn$(P02), S1$evn$(P02), BGevn(P02), S0$evn$(P21), S1$evn$(P21), BGevn(P21), and S0$evn$(P22), S1$evn$(P22), BGevn(P22) of the four pixels in the even-numbered lines are inputted to second condition background light remover 804 and second condition saturation determiner 805.

Second condition background light remover 804 makes a calculation using Expression 13, and outputs A0$evn$(P01), A1$evn$(P01), A0$evn$(P02), A1$evn$(P02), A0$evn$(P21), A1$evn$(P21), A0$evn$(P22), and A1$evn$(P22) to combination calculation processor 801.

$$A0evn(P01) = S0evn(P01) - BGevn(P01)$$

$$A1evn(P01) = S1evn(P01) - BGevn(P01)$$

$$A0evn(P02) = S0evn(P02) - BGevn(P02)$$

$$A1evn(P02) = S1evn(P02) - BGevn(P02)$$

$$A0evn(P21) = S0evn(P21) - BGevn(P21)$$

$$A1evn(P21) = S1evn(P21) - BGevn(P21)$$

$$A0evn(P22) = S0evn(P22) - BGevn(P22)$$

$$A1evn(P22) = S1evn(P22) - BGevn(P22) \quad \text{(Expression 13)}$$

Second condition saturation determiner 805 determines the conditions of Expression 14 for the above-described threshold value Smax. When any of the conditions of Expression 14 is satisfied, second condition saturation determiner 805 informs combination calculation processor 801 about the presence of a saturation signal.

$$S0evn(P01) > S\,\text{max}$$

$$S1evn(P01) > S\,\text{max}$$

$$BGevn(P01) > S\,\text{max}$$

$$S0evn(P02) > S\,\text{max}$$

$$S1evn(P02) > S\,\text{max}$$

$$BGevn(P02) > S\,\text{max}$$

$$S0evn(P21) > S\,\text{max}$$

$$S1evn(P21) > S\,\text{max}$$

$$BGevn(P21) > S\,\text{max}$$

$$S0evn(P22) > S\,\text{max}$$

$$S1evn(P22) > S\,\text{max}$$

$$BGevn(P22) > S\,\text{max} \quad \text{(Expression 14)}$$

Figure 10:
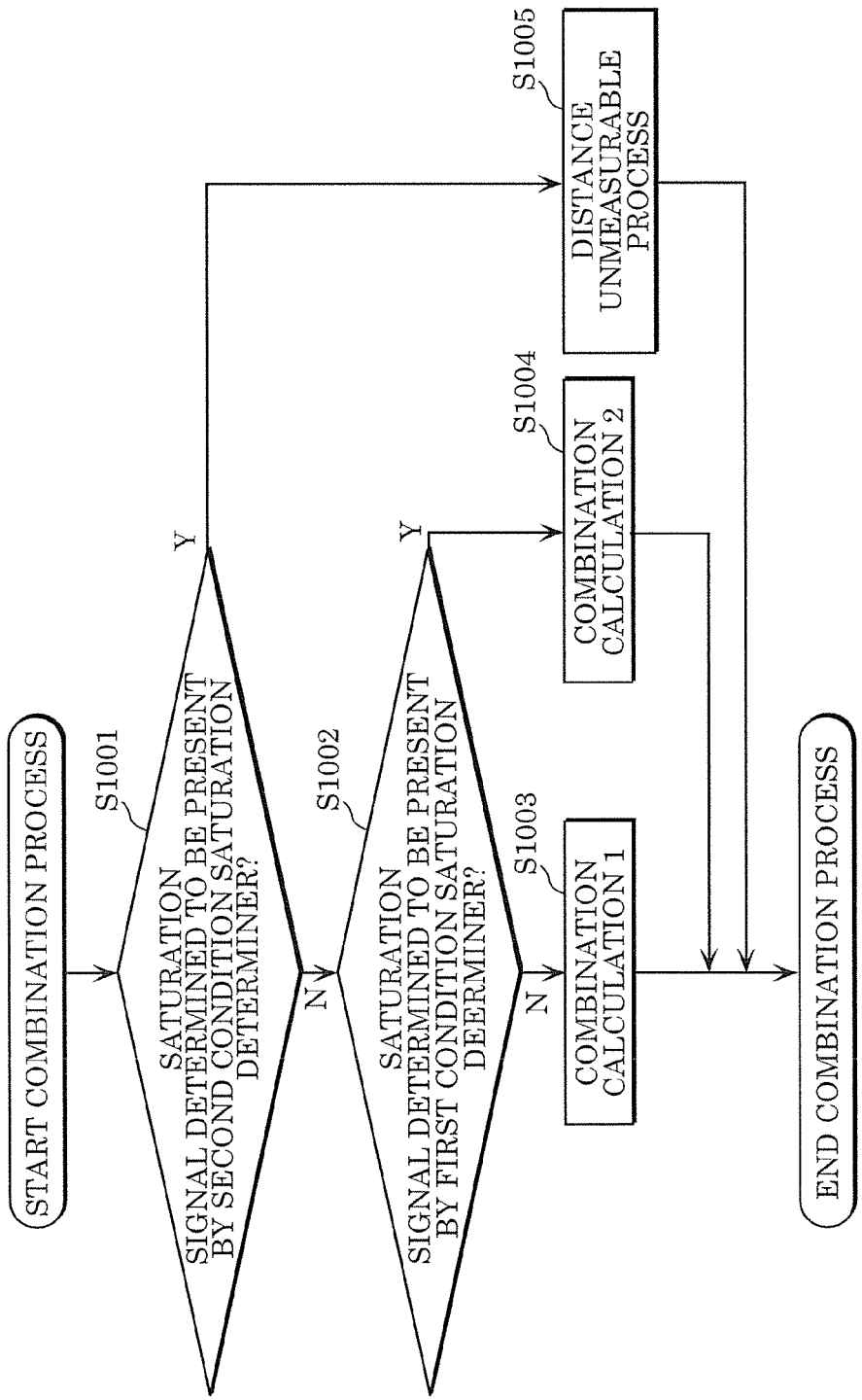
FIG. 10 is a flowchart illustrating the steps of combination calculation in the distance measuring device according to Embodiment 1.

Next, the following describes, as an example, processing performed by combination calculation processor 801. FIG. 10 is a flowchart illustrating the steps of combination calculation in distance measuring device 100 according to the present embodiment.

When the combination process is started, as described above, second condition saturation determiner 805 determines whether a saturation signal is present (Step S1001). When the saturation signal is determined to be present (Y in Step S1001), second condition saturation determiner 805 informs combination calculation processor 801 about the presence of the saturation signal. In this case, combination calculation processor 801 performs a distance unmeasurable process (Step S1005).

In the distance unmeasurable process, since light input exceeds the signal range of solid-state image sensor 102 even under the second condition of a short exposure time, accurate distance measurement cannot be performed using pixels to be processed. Accordingly, combination calculation processor 801 outputs a distance unmeasurable state to distance calculator 113.

When the saturation signal is determined to be absent (N in Step S1001), first condition saturation determiner 803 determines whether a saturation signal is present (Step S1002). When the saturation signal is determined to be present (Y in Step S1002), first condition saturation determiner 803 informs combination calculation processor 801 about the presence of the saturation signal. In this case, combination calculation processor 801 performs combination calculation 2 (Step S1004). When the saturation signal is determined to be absent, combination calculation processor 801 performs combination calculation 1 (Step S1003).

In combination calculation 1, since signals are inputted from solid-state image sensor 102 within a normal signal range in which all pixels to be processed are in an unsaturation state, combination calculation processor 801 makes a calculation using Expression 15, and outputs A0*mix* and A1*mix* to distance calculator 113.

$$A0mix = A0odd(P11) + A0evn(P01) + A0evn(P02) + A0evn(P21) + A0evn(P22)$$

$$A1mix = A1odd(P11) + A1evn(P01) + A1evn(P02) + A1evn(P21) + A1evn(P22) \quad \text{(Expression 15)}$$

Figure 11A:
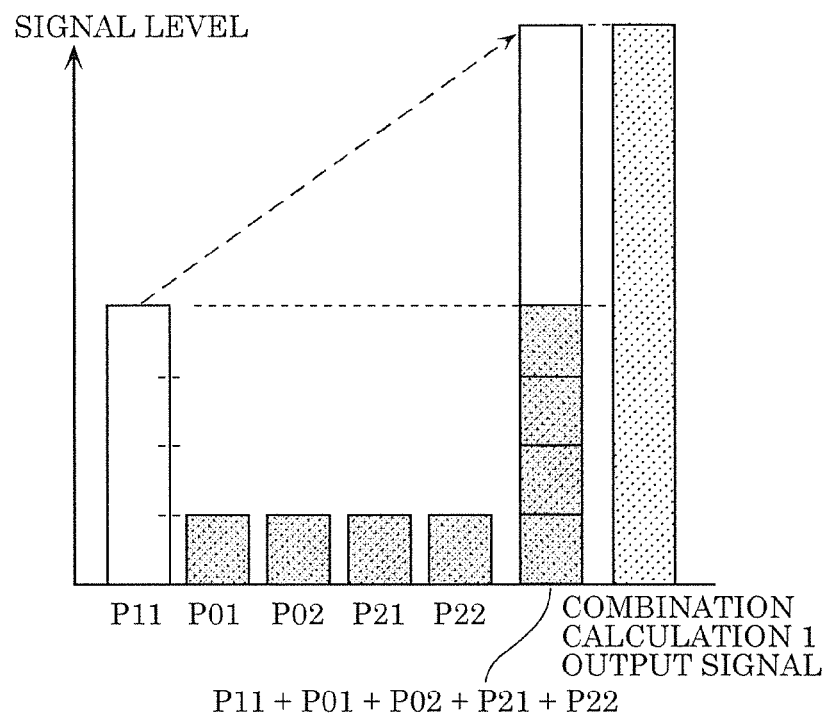
FIG. 11A is a graph illustrating a relationship between the amount of signal obtained by combination calculation 1 and an input signal in the distance measuring device according to Embodiment 1.

Here, the following shows, as the first example of combiner 112, a relationship between the amount of signal obtained by combination calculation 1 and an input signal. FIG. 11A is a graph illustrating a relationship between the amount of signal obtained by combination calculation 1 and an input signal in the distance measuring device according to Embodiment 1.

In the present embodiment, since the first condition and the second condition have an exposure time ratio of 4:1, an amount of signal that is eight times an amount of signal obtained from pixels under the second condition is obtained by combination calculation 1. As a result, combination calculation 1 achieves a high S/N ratio. Accordingly, since a horizontally and vertically symmetrical low-pass filter is formed that has a ratio of 1:3:3:1 at the half cycle of a pixel pitch in the horizontal direction and a ratio of 1:2:1 at the cycle of a pixel pitch in the vertical direction, there is no imbalance in spatial sampling points.

In combination calculation 2, light input exceeds the signal range of solid-state image sensor 102 under the first condition of an exposure time relatively longer than that of the second condition. Consequently, combination calculation processor 801 makes a calculation using Expression 16 with only pixel signals obtained under the second condition, and outputs A0*mix* and A1*mix* to distance calculator 113.

$$A0mix = \{A0evn(P01) + A0evn(P02) + A0evn(P21) + A0evn(P21)\} \times K$$

$$A1mix = \{A1evn(P01) + A1evn(P02) + A1evn(P21) + A1evn(P22)\} \times K \quad \text{(Expression 16)}$$

It should be noted that coefficient K in Expression 16 is predetermined from a ratio between the total value of one pixel having an exposure time under the first condition and the total value of four pixels having an exposure time under the second condition. Here, where the exposure time under the second condition is denoted as a, K is 2 in the present embodiment as calculated below.

$$K = (4a + 4 \times 1a)/(4 \times 1a) = 2$$

Figure 11B:
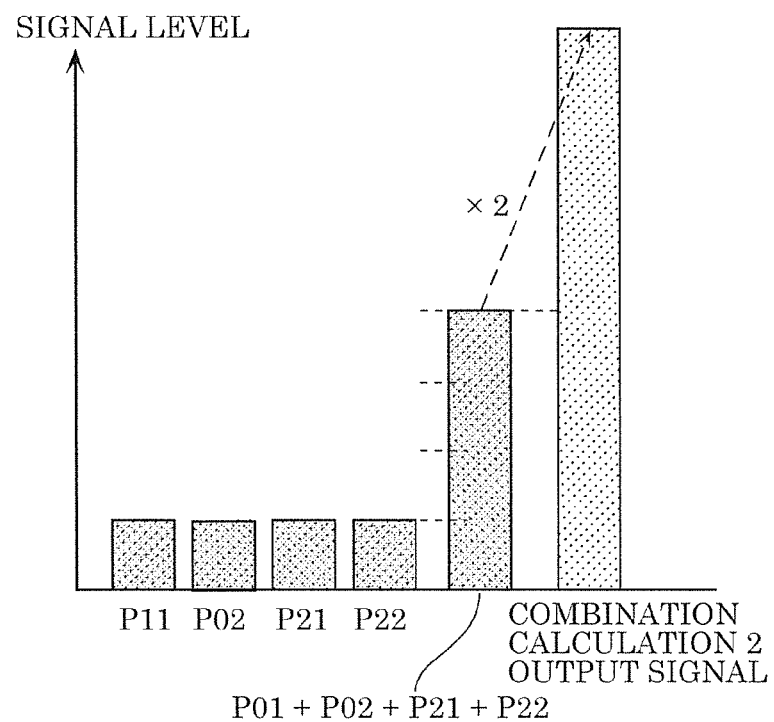
FIG. 11B is a graph illustrating a relationship between the amount of signal obtained by combination calculation 2 and an input signal in the distance measuring device according to Embodiment 1.

FIG. 11B is a relationship diagram illustrating a relationship between the amount of signal obtained by combination calculation 2 and an input signal. When a spatial low-pass filter or bilateral filter is disposed between combiner 112 and distance calculator 113 to further reduce, for example, signal noise by integrating, with a scale, the amount of signal obtained by combination calculation 1 via multiplication of coefficient K, even if reference pixel groups of the spatial filter have saturated and unsaturated pixel signals obtained as a result of exposure under the first condition, it is possible to properly perform filtering because the continuity of the amount of signal is maintained. This concludes the description of the first example of combiner 112.

Figure 12:
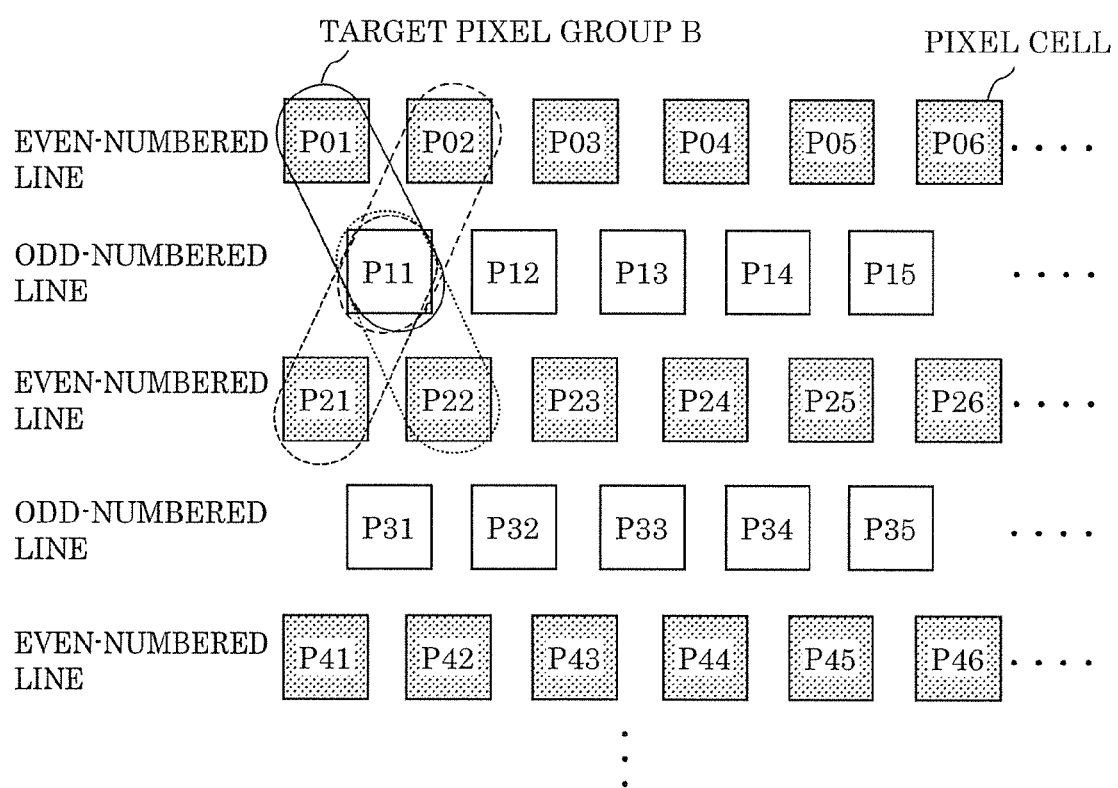
FIG. 12 is a pixel diagram referred to by the combiner in the distance measuring device according to Embodiment 1.

Next, the following shows, as the second example of combiner 112, a relationship between the amount of signal obtained by combination calculation 2 and an input signal. FIG. 11B is a graph illustrating a relationship between the amount of signal obtained by combination calculation 2 and an input signal in distance measuring device 100 according to the present embodiment. FIG. 12 is a pixel diagram referred to by combiner 112.

Combiner 112 receives, from line memory 111, signals S0, signals S1, and signals BG of one pixel in the odd-numbered line and one pixel in the even-numbered line which is adjacent above or below to the one pixel as shown in FIG. 12, the pixels being included as processing objects in target pixel group B.

For example, the pixel group of P01 and P11 in FIG. 12 is target pixel group B. Combiner 112 sequentially performs a signal process on the group of P02 and P11 and the group of P11 and P21. In the following description, P01 and P11, target pixel group B in FIG. 12, are used as an example.

It should be noted that the internal configuration of combiner 112 that performs combination calculation 2 is the same as shown in FIG. 8.

Input signals S0*odd*(P11), S1*odd*(P11), and BG*odd*(P11) of the one pixel in the odd-numbered line are inputted to first condition background light remover 802 and first condition saturation determiner 803.

First condition background light remover 802 makes the same calculation using Expression 11 as described above, and outputs A0*odd*(P11) and A1*odd*(P11) to combination calculation processor 801.

First condition saturation determiner 803 determines the same conditions of Expression 12, and compares above-described pre-set threshold value Smax with S0*odd*(P11), S1*odd*(P11), and BG*odd*(P11). When any of the input signals satisfies a condition of being greater, first condition saturation determiner 803 informs combination calculation processor 801 about the presence of a saturation signal.

Input signals S0evn(P01), S1evn(P01), and BGevn(P01) of the one pixel in the even-numbered line are inputted to second condition background light remover 804 and second condition saturation determiner 805.

Second condition background light remover 804 makes a calculation using Expression 17, and outputs A0evn(P01), A1evn(P01), and A0evn(P02) to combination calculation processor 801.

$$A0evn(P01)=S0evn(P01)-BGevn(P01)$$

$$A1evn(P01)=S1evn(P01)-BGevn(P01) \quad \text{(Expression 17)}$$

Second condition saturation determiner 805 determines the conditions of Expression 18 for above-described threshold value Smax. When any of the conditions is satisfied, second condition saturation determiner 805 informs combination calculation processor 802 about the presence of a saturation signal.

$$S0evn(P01) > S\max$$

$$S1evn(P01) > S\max$$

$$BGevn(P01) > S\max \quad \text{(Expression 18)}$$

The procedure of combination calculation processor 801 is the same as shown in FIG. 10, but how combination calculation 1 and combination calculation 2 are performed is different from FIG. 10.

In combination calculation 1, since signals are inputted within a signal range in which all pixels to be processed are normal, combination calculation processor 801 makes a calculation using Expression 19, and outputs A0mix and A1mix to distance calculator 113.

$$A0mix=A0odd(P11)+A0evn(P01) \times K2$$

$$A1mix=A1odd(P11)+A1evn(P01) \times K2 \quad \text{(Expression 19)}$$

It should be noted that coefficient K2 in Expression 19 is predetermined from a ratio between an exposure time under the first condition and an exposure time under the second condition. When the exposure time under the second condition is denoted as a, K2 is 4 in the present embodiment as calculated below.

$$K2=4a/1a=4$$

Figure 13A:
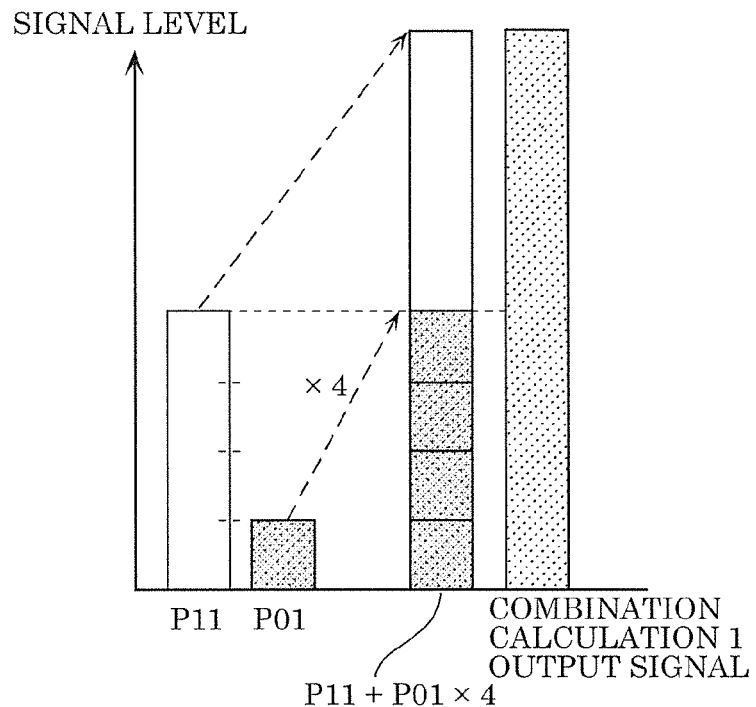
FIG. 13A is a graph illustrating a relationship between the amount of signal obtained by combination calculation 1 and an input signal in the distance measuring device according to Embodiment 1.

The following describes a relationship diagram illustrating a relationship between the amount of signal obtained by combination calculation 1 and an input signal. FIG. 13A is a relationship diagram illustrating a relationship between the amount of signal obtained by combination calculation 1 and an input signal. It is possible to absorb a difference between the exposure times under the first condition and the second condition by performing combination calculation 1 via multiplication of coefficient K2. For this reason, it is possible to uniformly maintain virtual centers of gravity of combined pixels in the column and row directions on the pixel array.

In combination calculation 2, combination calculation processor 801 makes a calculation using Expression 20 with only pixel signals obtained under the second condition, and outputs A0mix and A1mix to distance calculator 113.

$$A0mix=A0evn(P01) \times K3$$

$$A1mix=A1evn(P01) \times K3 \quad \text{(Expression 20)}$$

It should be noted that coefficient K3 in Expression 20 is predetermined from a ratio between the total value of one pixel having an exposure time under the first condition and a value four times an exposure time under the second condition, and the exposure time under the second condition. When the exposure time under the second condition is denoted as a, K3 is 8 in the present embodiment as calculated below.

$$K=(4a+4 \times 1a)/1a=8$$

Figure 13B:
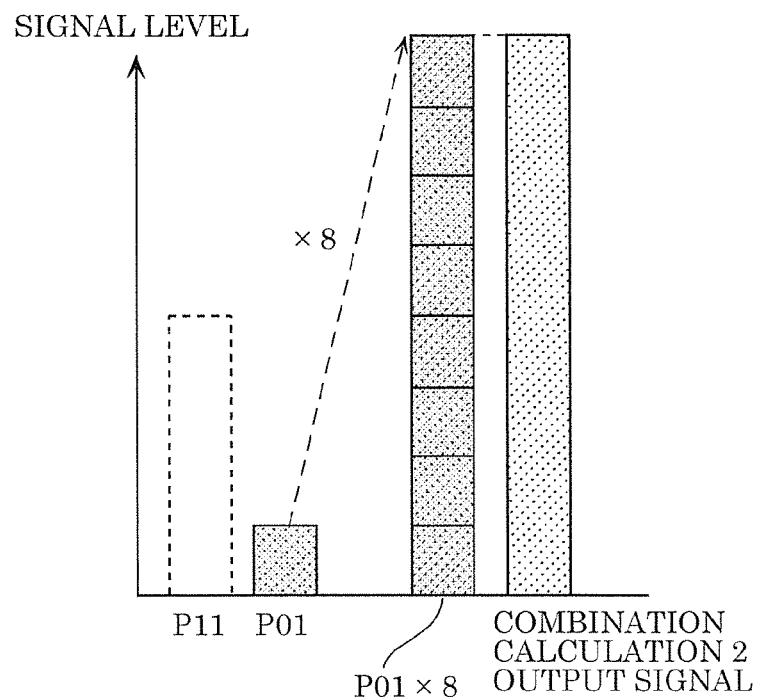
FIG. 13B is a graph illustrating a relationship between the amount of signal obtained by combination calculation 2 and an input signal in the distance measuring device according to Embodiment 1.

The following describes a relationship diagram illustrating a relationship between the amount of signal obtained by combination calculation 2 and an input signal. FIG. 13B is a relationship diagram illustrating a relationship between the amount of signal obtained by combination calculation 2 and an input signal. An effect of integrating, with a scale, the amount of signal obtained by combination calculation 1 via multiplication of coefficient K3 is the same as the effect described for the first example of combiner 112.

According to the second example of combiner 112, although a broad measurable range is ensured by differing the exposure times for the odd-numbered lines and even-numbered lines of solid-state image sensor 102, the combined pixel signals have high spatial resolution. This concludes the description of the second example of combiner 112.

Combined A0mix and A1mix outputted from combination calculation processor 801 are inputted as the output of combiner 112 to distance calculator 113.

When distance calculator 113 is informed about the above-described distance unmeasurable state by combination calculation processor 801, distance calculator 113 outputs output signal DO using a value indicating a predetermined distance unmeasurable state. When distance calculator 113 is not informed about the distance unmeasurable state by combination calculation processor 801, combination calculation processor 801 calculates output signal DO using Expression 21.

$$DO=A1mix/A0mix \quad \text{(Expression 21)}$$

Since Expression 21 is equivalent to Expression 2 corresponding to TOF technique 1 described in FIG. 2, output signal DO is a value corresponding to a distance to an object.

Further, Expression 21 can be made correspond to TOF technique 2 described in FIG. 3 as before, a pulse OFF period for shutter timing signal SH1 outputted from light emission and exposure controller 101 may be made approximately identical to a pulse light emission period for radiation light, and distance calculator 113 may make a calculation using Expression 22.

$$DO=A1mix/(A0mix+A1mix) \quad \text{(Expression 22)}$$

Embodiment 2

In Embodiment 1, the example has been described in which pixel groups on which solid-state image sensor 102 can perform exposure control independently include the two pixel groups in the odd-numbered line and the even-numbered line. In application of this technique, such pixel groups may include four pixel groups as shown in FIG. 14 to FIG. 17. Hereinafter, Embodiment 2 will be described with reference to FIG. 14 to FIG. 17.

Figure 14:
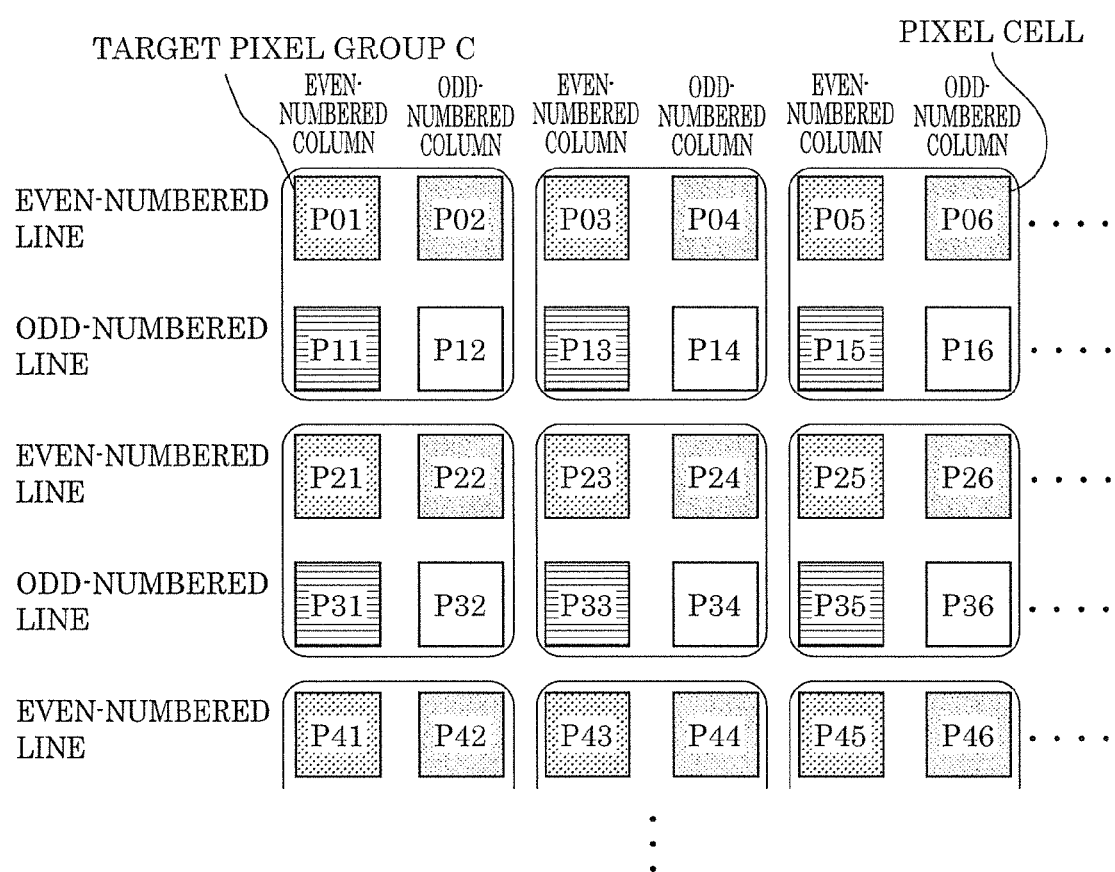
FIG. 14 is a pixel diagram illustrating a pixel arrangement in a solid-state image sensor and referred to by a combiner in a distance measuring device according to Embodiment 2.

FIG. 14 is a pixel diagram illustrating a pixel arrangement in solid-state image sensor 102 and referred to by combiner 112 in distance measuring device 100 according to the present embodiment. FIG. 14 shows the arrangement of pixel cells of solid-state image sensor 102, the configuration of each pixel group, and pixel combinations referred to by combiner 112. The following mainly describes differences from Embodiment 1.

Solid-state image sensor 102 includes pixels in the even-numbered lines and even-numbered columns (hereinafter referred to as the first pixel group), pixels in the even-numbered lines and odd-numbered columns (hereinafter referred to as the second pixel group), pixels in the odd-numbered lines and even-numbered columns (hereinafter referred to as the third pixel group), and pixels in the odd-numbered lines and odd-numbered columns (hereinafter referred to as the fourth pixel group). Solid-state image sensor 102 can perform exposure control on the four pixel groups independently.

For example, pixel P01 is the first pixel group, pixel P02 is the second pixel group, pixel P11 is the third pixel group, and pixel P12 is the fourth pixel group. In the following description, these pixels are given as examples.

In distance measuring device 100 according to the present embodiment, as before, exposure timing signal ET1 outputted from light emission and exposure controller 101 includes four sets of signals, each of the sets including a set of three exposure signals that are exposure signal S0, exposure signal S1, and exposure signal BG. Signal ET10$a$, signal ET11$a$, and signal ET12$a$ are provided to the first pixel group including pixel P01. Signal ET10$b$, signal ET11$b$, and signal ET12$b$ are provided to the second pixel group including pixel P02. Signal ET10$c$, signal ET11$c$, and signal ET12$c$ are provided to the third pixel group including pixel P11. Signal ET10$d$, signal ET11$d$, and signal ET12$d$ are provided to the fourth pixel group including pixel P12.

Figure 15:
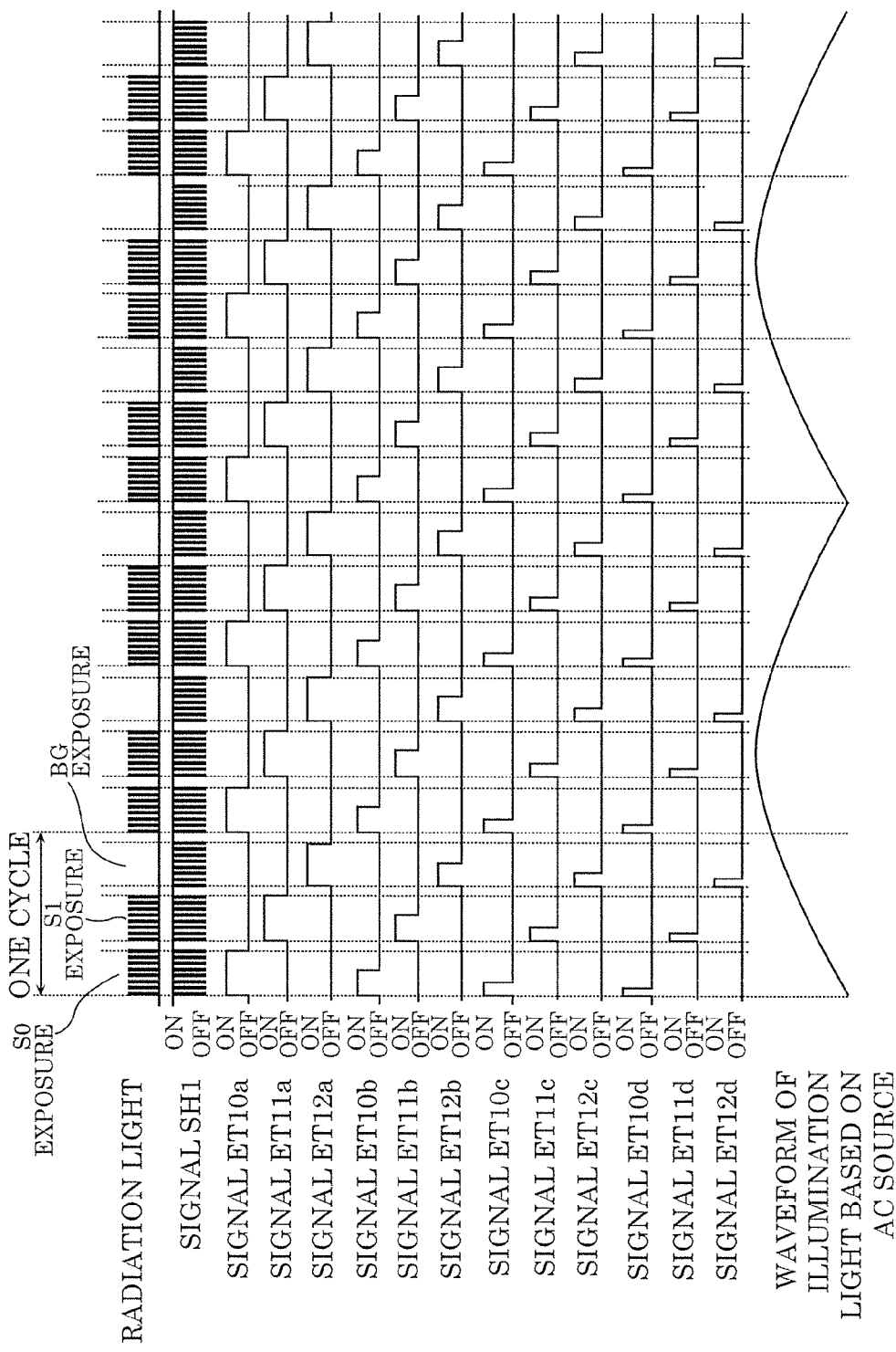
FIG. 15 is a timing chart for light emission and exposure control in the distance measuring device according to Embodiment 2.

Here, the following describes a relationship among the exposure timing signals outputted from light emission and exposure controller 101. FIG. 15 is a timing chart for light emission and exposure control in distance measuring device 100 according to the present embodiment.

In the present embodiment, as an example, an exposure time ratio for each of S0 exposure, S1 exposure, and BG exposure is configured as first pixel group:second pixel group:third pixel group:fourth pixel group=8:4:2:1, based on pulsed radiation light emitted according to light emission timing signal LT1 generated and outputted by light emission and exposure controller 101, and exposure times for the four pixel groups according to exposure timing signals generated and outputted by light emission and exposure controller 101.

As with Embodiment 1, even when exposure control that differs in exposure time is performed within the same frame of solid-state image sensor 102 in an environment in which illumination light from a lighting device receiving power from a commercial AC source is noise, the operations of light emission and exposure controller 101 according to the present embodiment make it possible to average signals including background light components subject to fluctuation in intensity of the illumination light. For this reason, it is possible to eliminate an unbalanced amount of the signals including the background light components among S0 exposure, S1 exposure, and BG exposure of the first to fourth pixel groups of solid-state image sensor 102. In particular, it is possible to accurately extract signals including illumination light components in the S0 exposure and S1 exposure of each pixel of the third pixel group or the fourth pixel group having a relatively short exposure time.

FIG. 14 shows, as the present embodiment, a relationship among the pixel groups referred to when combiner 112 in signal processor 103 performs combination.

Combiner 112 receives, from line memory 11, signals S0, signals S1, and signals BG of one pixel in the first pixel group, one pixel in the second pixel group, one pixel in the third pixel group, and one pixel in the fourth pixel group, the four pixels being adjacent to each other and included as processing objects in target pixel group C.

For example, P01, P02, P11, and P12 in FIG. 14 are target pixel group C. Combiner 112 sequentially performs a combination process on the group of P03, P04, P13, and P14 and the group of P21, P22, P31, and P32. In the following description, P01, P02, P11, and P12, target pixel group C in FIG. 14, are used as an example.

Figure 16:
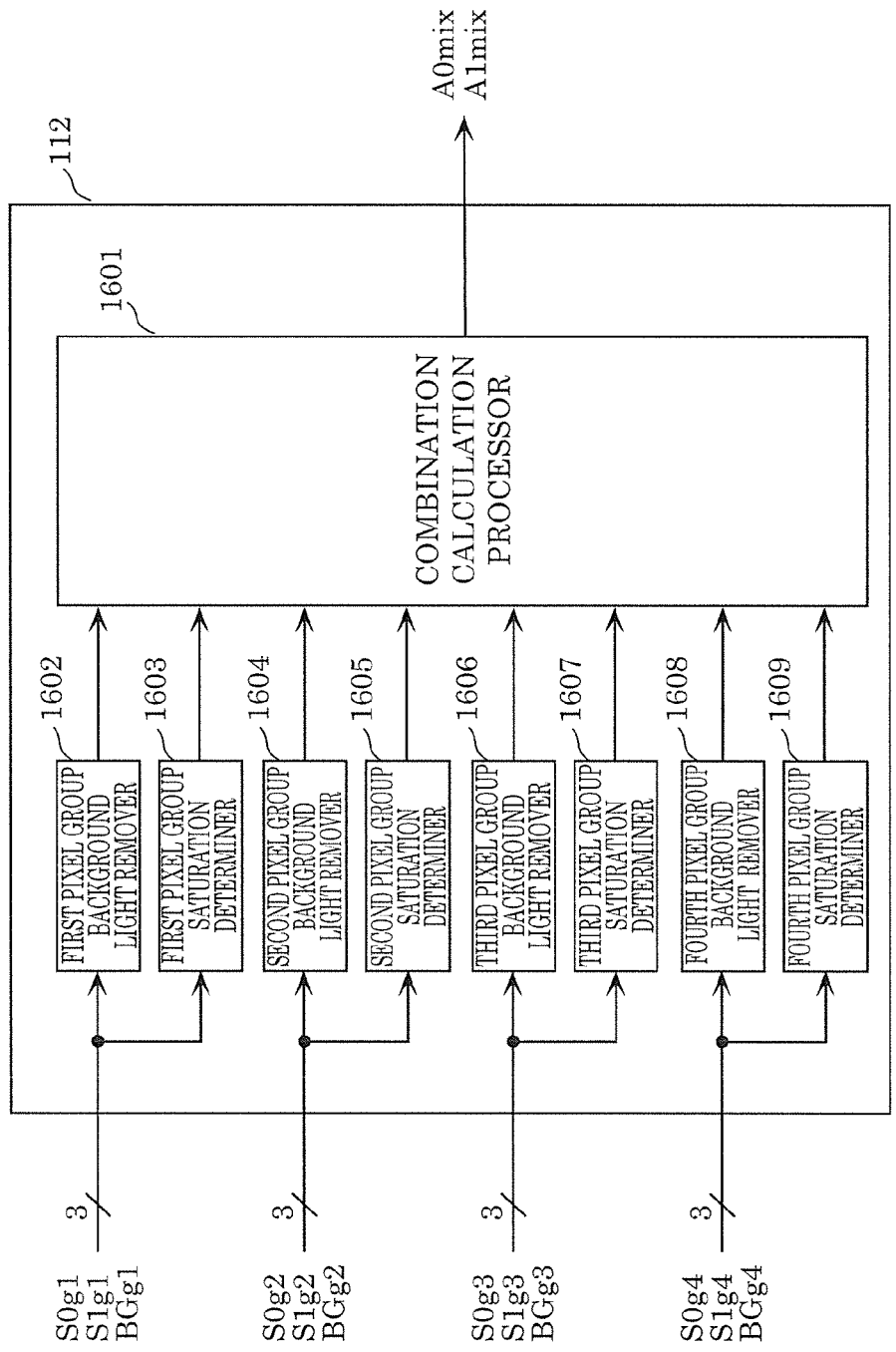
FIG. 16 is a schematic block diagram illustrating the combiner in the distance measuring device according to Embodiment 2.

FIG. 16 is a schematic block diagram illustrating combiner 112 in distance measuring device 100 according to the present embodiment. In the present embodiment, as shown in FIG. 16, combiner 112 includes combination calculation processor 1601, first pixel group background light remover 1602, first pixel group saturation determiner 1603, second pixel group background light remover 1604, second pixel group saturation determiner 1605, third pixel group background light remover 1606, third pixel group saturation determiner 1607, fourth pixel group background light remover 1608, and fourth pixel group saturation determiner 1609.

S0$g$1(P01), S1$g$1(P01), and BG$g$1(P01), which are signal S0, signal S1, and signal BG respectively, are inputted as the pixel signals of one pixel P01 in the first pixel group to first pixel group background light remover 1602 and first pixel group saturation determiner 1603.

First pixel group background light remover 1602 makes a calculation using Expression 23, and outputs A0$g$1(P01) and A1$g$1(P01) to combination calculation processor 1601.

$$A0g1(P01)=S0g1(P01)-BGg1(P01)$$

$$A1g1(P01)=S1g1(P01)-BGg1(P01) \quad \text{(Expression 23)}$$

As with Embodiment 1, first pixel group saturation determiner 1603 determines the conditions of Expression 24 for saturation determination threshold value Smax. When any of the conditions is satisfied, first pixel group saturation determiner 1603 informs combination calculation processor 1601 about the presence of a saturation signal.

$$S0g1(P01)>S\max$$

$$S1g1(P01)>S\max$$

$$BGg1(P01)>S\max \quad \text{(Expression 24)}$$

Input signals S0$g$2(P02), S1$g$2(P02), and BG$g$2(P02) of pixel P02 in the second pixel group are inputted in the same manner as pixel P01. Second pixel group background light remover 1604 calculates and outputs A0$g$2(P02) and A1$g$2(P02) to combination calculation processor 1601. Second pixel group saturation determiner 1605 informs combination calculation processor 1601 about the presence or absence of a saturation signal among S0$g$2(P02), S1$g$2(P02), and BG$g$2(P02).

Input signals S0$g$3(P11), S1$g$3(P11), and BG$g$3(P11) of pixel P11 in the third pixel group are inputted in the same manner as pixel P01. Third pixel group background light remover 1606 calculates and outputs A0$g$3(P11) and A1$g$3(P11) to combination calculation processor 1601. Third pixel group saturation determiner 1607 informs combination calculation processor 1601 about the presence or absence of a saturation signal among S0$g$3(P11), S1$g$3(P11), and BG$g$3(P11).

Input signals S0$g$4(P12), S1$g$4(P12), and BG$g$4(P12) of pixel P12 in the fourth pixel group are inputted in the same manner as pixel P01. Fourth pixel group background light remover 1608 calculates and outputs A0$g$4(P12) and A1$g$4(P12) to combination calculation processor 1601. Fourth pixel group saturation determiner 1609 informs combination calculation processor 1601 about the presence or absence of a saturation signal among S0$g$4(P12), S1$g$4(P12), and BG$g$4(P12).

Figure 17:
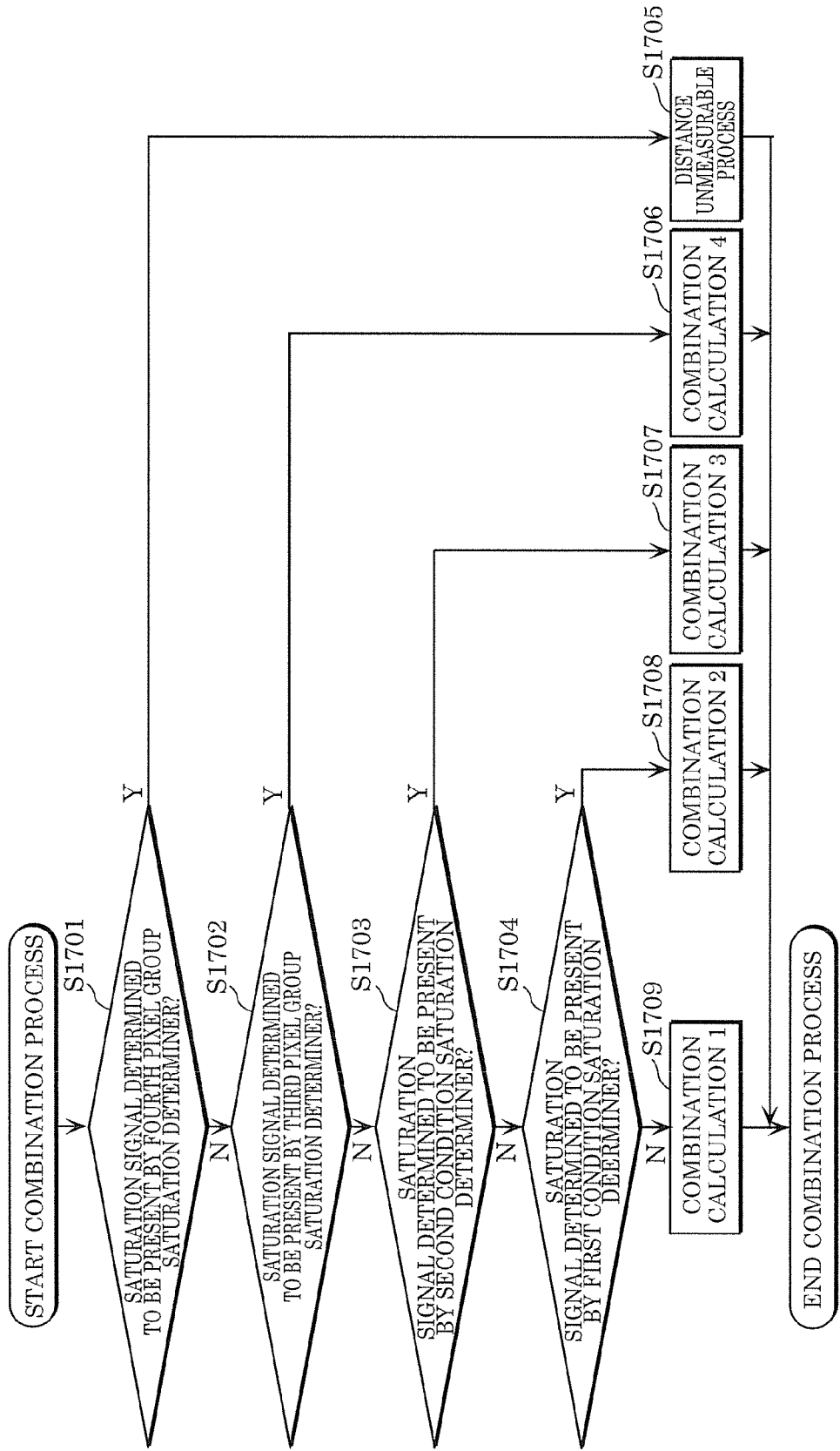
FIG. 17 is a flowchart illustrating the steps of combination calculation in the distance measuring device according to Embodiment 2.

Next, the following describes, as an example, processing performed by combination calculation processor 1601. FIG. 17 is a flowchart illustrating the steps of combination calculation in distance measuring device 100 according to the present embodiment.

When the combination process is started, fourth pixel group saturation determiner 1609 determines whether a saturation signal is present (Step S1701). When the saturation signal is determined to be present (Y in Step S1701), fourth pixel group saturation determiner 1609 informs combination calculation processor 1601 about the presence of the saturation signal. In this case, combination calculation processor 1601 performs a distance unmeasurable process (Step S1705).

In the distance unmeasurable process, since light input exceeds the signal range of solid-state image sensor 102 even for the pixel in the fourth pixel group having the shortest exposure time, accurate distance measurement cannot be performed using pixels to be processed. Accordingly, combination calculation processor 1601 outputs a distance unmeasurable state to distance calculator 113.

When the saturation signal is determined to be absent (N in Step S1701), third pixel group saturation determiner 1607 determines whether a saturation signal is present (Step S1702). When the saturation signal is determined to be present (Y in Step S1702), third pixel group saturation determiner 1607 informs combination calculation processor 1601 about the presence of the saturation signal. In this case, combination calculation processor 1601 performs combination calculation 4 (Step S1706).

When the saturation signal is determined to be absent (N in Step S1702), second pixel group saturation determiner 1605 determines whether a saturation signal is present (Step S1703). When the saturation signal is determined to be present (Y in Step S1703), second pixel group saturation determiner 1605 informs combination calculation processor 1601 about the presence of the saturation signal. In this case, combination calculation processor 1601 performs combination calculation 3 (Step S1707).

When the saturation signal is determined to be absent (N in Step S1703), first pixel group saturation determiner 1603 determines whether a saturation signal is present (Step S1704). When the saturation signal is determined to be present (Y in Step S1704), first pixel group saturation determiner 1603 informs combination calculation processor 1601 about the presence of the saturation signal. In this case, combination calculation processor 1601 performs combination calculation 2 (Step S1708).

When the saturation signal is determined to be absent (N in Step S1704), combination calculation processor 1601 performs combination calculation 1. In combination calculation 1, since signals are inputted from solid-state image sensor 102 within a normal signal range in which all pixels to be processed are in an unsaturation state, combination calculation processor 1601 makes a calculation using Expression 25, and outputs A0$mix$ and A1$mix$ to distance calculator 113.

$$A0mix = A0g1(P01) + A0g2(P02) + A0g3(P11) + A0g4(P12)$$

$$A1mix = A1g1(P01) + A1g2(P02) + A1g3(P11) + A1g4(P12) \quad \text{(Expression 25)}$$

Since the above-described exposure time ratio from the first pixel group to the fourth pixel group is 8:4:2:1, output signal A0$mix$ has an amount of signal fifteen times greater than that of signal A0$g4$ of P12 having the shortest exposure time. Likewise, output signal A1$mix$ has an amount of signal fifteen times greater than that of signal A1$g4$ of P12.

In combination calculation 2, among the pixels to be processed, only P01 in the first pixel group is saturated. Accordingly, combination calculation processor 1601 excludes the pixel signal of P01, makes a calculation using Expression 26, and outputs A0$mix$ and A1$mix$ to distance calculator 113.

$$A0mix = A0g2(P02) + A0g3(P11) + A0g4(P12)$$

$$A1mix = A1g2(P02) + A1g3(P11) + A1g4(P12) \quad \text{(Expression 26)}$$

In combination calculation 3, among the pixels to be processed, P01 in the first pixel group and P02 in the second pixel group are saturated. Accordingly, combination calculation processor 1601 excludes the pixel signals of P01 and P02, makes a calculation using Expression 27, and outputs A0$mix$ and A1$mix$ to distance calculator 113.

$$A0mix = A0g3(P11) + A0g4(P12)$$

$$A1mix = A1g3(P11) + A1g4(P12) \quad \text{(Expression 27)}$$

In combination calculation 4, the signal is outputted from solid-state image sensor 102 within a normal signal range in which, among the pixels to be processed, only P12 in the fourth pixel group is in an unsaturation state. Accordingly, combination calculation processor 1601 makes a calculation using Expression 28, and outputs A0$mix$ and A1$mix$ to distance calculator 113.

$$A0mix = A0g4(P12)$$

$$A1mix = A1g4(P12) \quad \text{(Expression 28)}$$

It should be noted that distance calculator 113 operates in the same manner in Embodiments 1 and 2.

According to Embodiment 2 as described above, the independent exposure control of the four pixel groups makes it possible to expand the signal range of solid-state image sensor 102 by eight times. In other words, distance measuring device 100 according to the present embodiment can expand a distance measurement range by slightly less than three times in terms of distance, compared to distance measuring device 100 according to Embodiment 1.

It should be noted that the exposure time ratio of the four pixel groups is not limited to the ratio described in Embodiment 2, the exposure time ratio can be easily changed by changing the timings of exposure timing signals generated by light emission and exposure controller 101.

Moreover, although the number of pixel groups on which distance measuring device 100 according to Embodiment 2 performs exposure time control independently is four, it is possible to easily further increase the number of pixel groups on which exposure control is performed independently, by increasing the number of exposure timing signals generated by light emission and exposure controller 101, and increasing the number of division lines to the pixel cells in solid-state image sensor 102 for the exposure timing signals.

According to the embodiments as described above, a distance measuring device can be achieved that (i) expands the distance measurement range of a solid-state image sensor within one frame, which is restricted by the attenuation of light caused by a distance to an object or a decrease in intensity of reflected light caused by the surface reflectance of the object, (ii) is unaffected when the distance to the object changes in a temporal direction, (iii) is capable of removing the influence of disturbance caused by background light other than radiation light, and (iv) is further capable of obtaining a distance image having reasonable accuracy. Further, a distance measuring device can be achieved that does not require a frame memory or the like, is small, and costs low.

INDUSTRIAL APPLICABILITY

The present disclosure is applicable to, for example, devices that detect the presence of a person, such as vehicle-mounted passenger detection devices, monitoring devices for industrial factory automation (FA), and input devices that three-dimensionally detect the motion of arms or fingers of a person to recognize a gesture of the person, and receive a user interface input for a specific device including a PC.

REFERENCE MARKS IN THE DRAWINGS 100 distance measuring device
101 light emission and exposure controller
102 solid-state image sensor
130 signal processor
104 light emitter
111 line memory
112 combiner
113 distance calculator
114 light source driver
115 light source
501 photodiode
502 reset transistor
510 analog switch
511 analog switch
512 analog switch
520 analog memory
521 analog memory
522 analog memory
530 amplifier
531 amplifier
532 amplifier
801 combination calculation processor
802 first condition background light remover
803 first condition saturation determiner
804 second condition background light remover
805 second condition saturation determiner
1601 combination calculation processor
1602 first pixel group background light remover
1603 first pixel group saturation determiner
1604 second pixel group background light remover
1605 second pixel group saturation determiner
1606 third pixel group background light remover
1607 third pixel group saturation determiner
1608 fourth pixel group background light remover
1609 fourth pixel group saturation determiner

The invention claimed is:

1. A distance measuring device that measures a distance to an object using a round-trip time of light in a background light environment in which a quantity of background light fluctuates periodically, the distance measuring device comprising:
a light emitter including a light source that radiates light to a measurement target range;
a solid-state image sensor that includes a plurality of pixels included in a plurality of pixel groups capable of being exposed independently, and causes the plurality of pixels to perform photoelectric conversion of reflected light from the object within an angle of view of radiation light from the light emitter, the plurality of pixels being arranged in a matrix;
a light emission and exposure controller that (i) instructs a light emission timing and a light emission period of the light source to the light emitter, (ii) instructs, to each of the plurality of pixel groups in the solid-state image sensor, an exposure timing and an exposure period for obtaining pixel signals of types corresponding to a time difference between the radiation light and the reflected light due to a round-trip time of light, and (iii) intermittently exposes the plurality of pixels by exposing each of the plurality of pixel groups at a different exposure time in at least two cyclic exposure periods in a light quantity fluctuation cycle period of the background light according to the exposure timing and the exposure period without changing total cyclic exposure periods, the pixel signals of the types corresponding to the time difference between the radiation light and the reflected light; and
a signal processor that calculates a distance value of the object of which an image is formed by the solid-state image sensor, according to pixel signals of at least two adjacent pixels exposed at the different exposure times for each of the plurality of pixel groups in the solid-state image sensor, the pixel signals corresponding to the time difference,
wherein the light emission and exposure controller causes the light emitter to intermittently radiate the light in at least two emission periods within the light quantity fluctuation cycle period.

2. The distance measuring device according to claim 1, wherein the signal processor includes:
a combiner that combines the pixel signals of the at least two adjacent pixels into a combined pixel signal corresponding to the time difference; and
a distance calculator that calculates the distance value of the object from the combined pixel signal, according to the time difference between the radiation light and the reflected light.

3. The distance measuring device according to claim 2, wherein the combiner (i) determines whether each of the pixel signals of the at least two adjacent pixels is saturated, (ii) excludes, when at least one of the pixel signals of the at least two adjacent pixels is determined to be saturated, the at least one pixel signal determined to be saturated, and (iii) obtains the combined pixel signal.

4. The distance measuring device according to claim 3, wherein when the at least one pixel signal is determined to be saturated, the combiner interpolates the at least one signal determined to be saturated, by multiplying, among the pixel signals of the at least two adjacent pixels, a pixel signal determined to be unsaturated by a scale factor of an exposure time corresponding to the at least one pixel signal determined to be saturated to an exposure time corresponding to the pixel signal determined to be unsaturated, and combines the at least one pixel signal interpolated.

5. The distance measuring device according to claim 1, wherein in the solid-state image sensor, at least two of the plurality of pixel groups include a first pixel group and a second pixel group, the at least two of the plurality of pixel groups being capable of being exposed independently, the first pixel group including, among the plurality of pixels in the solid-state image sensor, pixels in odd-numbered rows, the second pixel group including, among the plurality of pixels in the solid-state image sensor, pixels in even-numbered rows.

6. The distance measuring device according to claim 1, wherein in the solid-state image sensor, at least two of the plurality of pixel groups include a first pixel group, a second pixel group, a third pixel group, and a fourth pixel group, the at least two of the plurality of pixel groups being capable of being exposed independently, the first pixel group including, among the plurality of pixels in the solid-state image sensor, pixels in even-numbered rows and even-numbered columns, the second pixel group including, among the plurality of pixels in the solid-state image sensor, pixels in the even-numbered rows and odd-numbered columns, the third pixel group including, among the plurality of pixels in the solid-state image sensor, pixel in odd-numbered rows and the even-numbered columns, the fourth pixel group including, among the plurality of pixels in the solid-state image sensor, pixels in the odd-numbered rows and the odd-numbered columns.

7. The distance measuring device according to claim 1, wherein in the light emission and exposure controller, when a cycle of the exposure period for each of the pixel signals of the plurality of pixel groups in the solid-state image sensor is denoted as Tcyc, and the number of exposure periods within one frame is denoted as Ncyc, Tcyc is approximately 1/n relative to a cycle period Tbg of a light source that is included in a lighting device receiving power from a commercial AC source, cyclically fluctuates, and emits the background light, a time TcycxNcyc that is necessary for exposure and includes an idle period is approximately m times the cycle period Tbg, n being a natural number greater than or equal to 2, m being a natural number greater than or equal to 1.

8. The distance measuring device according to claim 1, wherein the light emission and exposure controller controls the solid-state image sensor so that in an intermittent exposure period for each of the pixel signals of the plurality of pixel groups in the solid-state image sensor, an exposure period of one of the plurality of pixel groups temporally overlaps an exposure period of another of the plurality of pixel groups, the intermittent exposure period corresponding to the time difference between the radiation light and the reflected light, the exposure period of the other of the plurality of pixel groups being relatively shorter than the exposure period of the one of the plurality of pixel groups.

9. The distance measuring device according to claim 1, wherein the light emission and exposure controller controls the solid-state image sensor so that in an exposure period for at least one of the pixel signals of the plurality of pixel groups, photoelectric conversion of only the background light results in a pixel signal by setting an exposure timing at which the reflected light from the object is not incident on the solid-state image sensor, the exposure period for the at least one of the pixel signals being included in an intermittent exposure period for each of the pixel signals, the intermittent exposure period corresponding to the time difference between the radiation light and the reflected light, and the combiner excludes a background light component from a pixel signal that is at least one of the pixel signals of the two adjacent pixels and includes both a radiation light component and the background light component, using the pixel signal including only the background light component.

10. The distance measuring device according to claim 1, wherein the solid-state image sensor includes: a photodiode that performs photoelectric conversion on the plurality of pixels; a plurality of analog memories that selectively accumulate and hold electric charges generated as a result of the photoelectric conversion by the photodiode; and an electronic shutter that discards, for all the plurality of pixels, the electric charges generated by the photodiode, the selective accumulation and holding of the electric charges generated by the photodiode being common to each of the plurality of pixel groups, the light emission and exposure controller instructs control of switching of the electronic shutter in the solid-state image sensor, and control of the selective accumulation and holding of the electric charges in each of the plurality of analog memories for a corresponding one of the plurality of pixel groups, and the light emission and exposure controller causes the light emitter to emit pulsed radiation light multiple times, controls the switching of the electronic shutter that generates a pulse synchronized with the pulsed radiation light and having a phase different from a phase of the pulse radiation light, instructs a predetermined one of the plurality of analog memories for a predetermined one of the plurality of pixel groups in the solid-state image sensor to accumulate electric charges in a control period for the electronic shutter that generates the pulse having a phase identical to a phase of the pulsed radiation light, and controls the solid-state image sensor so that the different exposure time of each of the plurality of pixel groups in the solid-state image sensor is generated according to a difference in length of a period of the accumulation of the electric charges corresponding to the number of times the pulsed radiation light is repeatedly emitted.

* * * * *